US012632602B2

(12) United States Patent (10) Patent No.: US 12,632,602 B2
Ruelke et al. (45) Date of Patent: May 19, 2026

(54) INCIDENT-BASED TRANSFORMATIONS OF GRAPHICAL USER INTERFACES FOR COMMUNICATIONS SYSTEMS WITH DUAL-VISUAL DISPLAYS

(71) Applicant: MOTOROLA SOLUTIONS, INC., Chicago, IL (US)

(72) Inventors: Charles R. Ruelke, Coral Springs, FL (US); Marjorie R. Bolden, Chicago, IL (US); Melani Gordon, Temecula, CA (US); Joshua Tukuafu, South Jordan, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 133 days.

(21) Appl. No.: 18/454,525

(22) Filed: Aug. 23, 2023

(65) Prior Publication Data

US 2025/0068771 A1 Feb. 27, 2025

(51) Int. Cl.
*G06F 21/62* (2013.01)
*H04L 67/306* (2022.01)

(52) U.S. Cl.
CPC .......... *G06F 21/629* (2013.01); *H04L 67/306* (2013.01)

(58) Field of Classification Search
CPC ... G07C 5/08; G07C 5/00; G07C 5/02; G06N 20/00; H04B 1/38; H04B 17/318; H04B 1/00; H04B 1/3827; H04B 7/08; H04B 1/04; H04B 1/48; H04B 1/525; H04B 17/00; H04B 7/06; H04B 7/212; H04B 7/26; H04B 1/18; H04B 1/3888; H04B 17/382; H04B 1/10; H04B 1/12; H04B 1/40; H04B 1/401; H04B 1/52; H04B 1/54; H04B 1/56; H04B 1/68; H04B 10/00;

(Continued)

(56) References Cited

U.S. PATENT DOCUMENTS 6,943,703 B2 9/2005 Rubenstein
10,685,075 B2 6/2020 Blanco et al.

(Continued)

OTHER PUBLICATIONS

Peterson, "How to Add Wireless Carplay to Your Vehicle," <https://appletoolbox.com/how-to-add-wireless-carplay-to-your-vehicle/> article dated Dec. 29, 2022 (20 pages).

*Primary Examiner* — Rayeez R Chowdhury
(74) *Attorney, Agent, or Firm* — Michael Best & Friedrich LLP

(57) ABSTRACT
A system includes an in-vehicle assistant (IVA) platform and a mobile communication device. The IVA platform includes a first electronic processor, a first display, and a first communications interface. The mobile communication device includes a second electronic processor, a second display, and a second communications interface. At least one of the first electronic processor or the second electronic processor is configured to access a user profile, parse the user profile to identify a set of applications authorized for use by the user profile, the set of applications including a first application and a second application, generate and render a first graphical user interface (GUI) on the first display, generate and render a second GUI on the second display, render the first application on the first GUI and not on the second GUI, and render the second application on the second GUI and not on the first GUI.

20 Claims, 15 Drawing Sheets

(58) Field of Classification Search
　　　CPC ...... H04B 10/54; H04B 10/564; H04B 15/02;
　　　　　　　　　H04B 17/10; H04B 7/00; H04B 7/02;
　　　　　　　　　H04B 7/12; B07C 3/00; B07C 5/00;
　　　　　　　　G06Q 10/08; G06Q 10/06; G06Q 30/00;
　　　　　　　　　　　　　　　　　G08B 21/18
　　　See application file for complete search history.

(56) References Cited

U.S. PATENT DOCUMENTS

| | | | |
|---|---|---|---|
| 10,902,722 B2 | 1/2021 | Lin | |
| 2007/0038946 A1* | 2/2007 | Grieshaber | H04N 1/00464 |
| | | | 715/762 |
| 2010/0311443 A1* | 12/2010 | Abuelsaad | G06Q 10/107 |
| | | | 455/466 |
| 2011/0313934 A1* | 12/2011 | Van Roy | G06Q 10/10 |
| | | | 705/301 |
| 2013/0219303 A1* | 8/2013 | Eriksson | G06F 3/1454 |
| | | | 715/759 |
| 2013/0290863 A1* | 10/2013 | Chen | H04L 65/4015 |
| | | | 715/747 |
| 2015/0146550 A1* | 5/2015 | Pollard | H04W 24/02 |
| | | | 370/252 |
| 2016/0358017 A1* | 12/2016 | Guzik | G06V 20/59 |
| 2017/0168765 A1* | 6/2017 | Fan | G06F 3/1275 |
| 2017/0329466 A1* | 11/2017 | Krenkler | G06F 9/453 |
| 2018/0351962 A1* | 12/2018 | Kulkarni | H04W 12/64 |

* cited by examiner

| User Rank | Administrator Module 332 | Mapping Module 324 | Location Module 322 | Messaging Module 326 | Voice Call Functionality 402 | Fleet Map Functionality 404 |
|---|---|---|---|---|---|---|
| Officer | False | True | True | True | True | False |
| Supervisor | False | True | True | True | True | True |
| Administrator | True | True | True | True | True | True |

FIG. 4

Graphical User Interface 700

802

Lock Screen

Figure 9A:
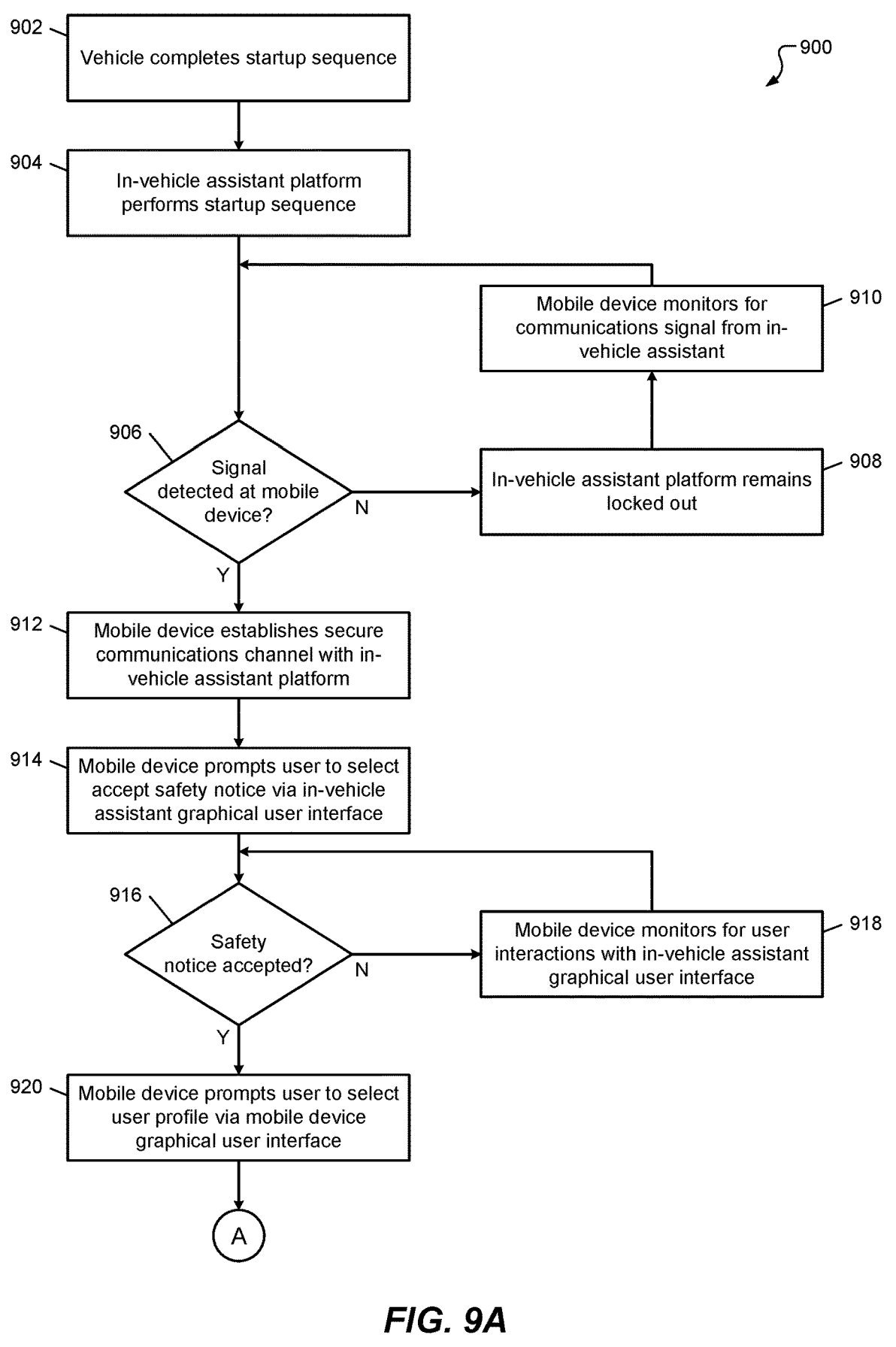

902 — Vehicle completes startup sequence

904 — In-vehicle assistant platform performs startup sequence

910 — Mobile device monitors for communications signal from in-vehicle assistant 906 — Signal detected at mobile device?

N

908 — In-vehicle assistant platform remains locked out

Y

912 — Mobile device establishes secure communications channel with in-vehicle assistant platform 914 — Mobile device prompts user to select accept safety notice via in-vehicle assistant graphical user interface 916 — Safety notice accepted?

N

918 — Mobile device monitors for user interactions with in-vehicle assistant graphical user interface

Y

920 — Mobile device prompts user to select user profile via mobile device graphical user interface

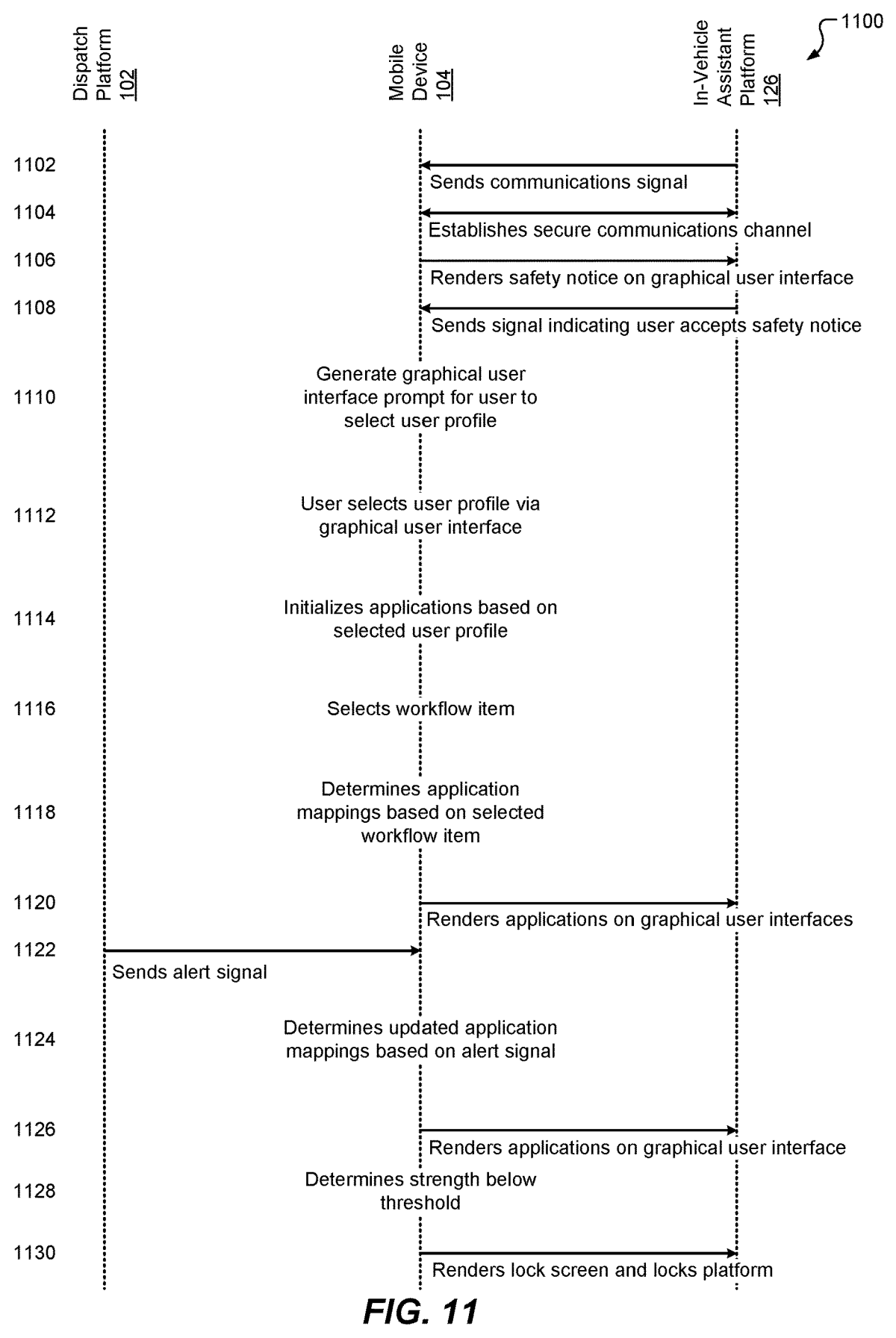

Dispatch Platform 102

Mobile Device 104

In-Vehicle Assistant Platform 126

1100

1102 — Sends communications signal

1104 — Establishes secure communications channel

1106 — Renders safety notice on graphical user interface

1108 — Sends signal indicating user accepts safety notice

1110 — Generate graphical user interface prompt for user to select user profile

1112 — User selects user profile via graphical user interface

1114 — Initializes applications based on selected user profile

1116 — Selects workflow item

1118 — Determines application mappings based on selected workflow item

1120 — Renders applications on graphical user interfaces

1122 — Sends alert signal

1124 — Determines updated application mappings based on alert signal

1126 — Renders applications on graphical user interface

1128 — Determines strength below threshold

1130 — Renders lock screen and locks platform

*FIG. 11*

INCIDENT-BASED TRANSFORMATIONS OF GRAPHICAL USER INTERFACES FOR COMMUNICATIONS SYSTEMS WITH DUAL-VISUAL DISPLAYS

FIELD

The present disclosure relates to communications systems and, more particularly, to selective dual-visual display systems of communications systems.

SUMMARY

Land mobile radio systems are a critical communication tool for public safety agencies like police departments, fire departments, and emergency medical services. Land mobile radio systems offer a variety of benefits when used in mission-critical applications by public safety agencies. For example, land mobile radio system components are designed to be robust and reliable, even under challenging physical conditions, in comparison to components in other communication systems. This makes them effective communications tools during emergencies, where reliable communications are important. Land mobile radio systems also support interoperability standards that allow different agencies to communicate with one another. This is advantageous in situations where multiple agencies are responding to the same incident, as it allows the multiple agencies to coordinate and share information. Furthermore, by using a network of repeaters and base stations, land mobile radio systems can provide coverage across large areas, helping to ensure that public safety officers can communicate even when located relatively distant from one another. Land mobile radio systems also include encryption and other security measures to help maintain the privacy of communications, which helps ensure that information about ongoing public safety operations is available only to those with a need to know.

These advantages afforded by land mobile radio systems are also applicable to non-public safety operations, including commercial business communication systems operating in demanding environments (e.g., in oil refineries, medical institutions, and aviation), or even consumer businesses where supply chain or other real-time status-specific telemetry must be managed for a desired outcome. In these examples, land mobile radio systems facilitate one-to-many wide area coverage communication, interoperability between different groups of users and/or devices, and secure and private communications.

While land mobile radio systems can offer robust, reliable, and secure communications between different public safety agencies across wide geographical areas, designing display systems and graphical user interfaces for land mobile radio systems can be challenging due to the requirements of public safety missions. For example, public safety personnel often operate under high-stress, time-sensitive conditions. Thus, display systems and graphical user interfaces need to be intuitive and quick to navigate to help reduce the cognitive load of public safety personnel during emergency operations. As screen space of mobile devices and in-vehicle assistant displays may be limited, graphical user interfaces need to be designed to prioritize how information is presented in the limited space. Public safety situations can also develop and evolve rapidly. Thus, graphical user interfaces need to be able to quickly adapt to these rapid developments and update public safety personnel without increasing their cognitive load. Furthermore, the nature of the information involved in public safety applications often requires strong security measures to prevent the information from being compromised.

Accordingly, what is needed are display systems and graphical user interfaces for land mobile radio systems and affiliated vehicles that are capable of presenting critical information to radio system operators in a limited display area and selectively updating the presentation in response to rapid changes in the situation—all while reducing the cognitive load required to process the information. Furthermore, what is needed are display systems and graphical user interfaces for land mobile radio systems and emergency response vehicles that are capable of automatically securing confidential and sensitive information under high-stress, high-workload conditions without direct intervention (and cognitive attention) by public safety personnel. Optimization of the display systems and graphical interfacing between land mobile radio systems and vehicles is also applicable to private sector operations where operators could benefit from time-sensitive responses to dynamic operating environments.

A system includes an in-vehicle assistant (IVA) platform and a mobile communication device. The in-vehicle assistant platform includes a first electronic processor, a first display, and a first communications interface. The mobile communication device includes a second electronic processor, a second display, and a second communications interface. At least one of the first electronic processor or the second electronic processor is configured to access a user profile, parse the user profile to identify a set of applications authorized for use by the user profile, the set of applications including a first application and a second application, generate and render a first graphical user interface (GUI) on the first display, generate and render a second GUI on the second display, render the first application on the first GUI and not on the second GUI, and render the second application on the second GUI and not on the first GUI.

In other features, the mobile communication device includes a third communications interface. The mobile communication device is configured to receive the user profile from a dispatch platform via the third communications interface. In other features, the mobile communication device is configured to receive an alert signal from the dispatch platform via the third communications interface. At least one of the first electronic processor or the second electronic processor is configured to, in response to the mobile communication device receiving the alert signal, select a third application from among the set of applications authorized for use by the user profile based on the alert signal and render the third application in a priority field of the first GUI.

In other features, the first communications interface is configured to be operatively coupled to the second communications interface via at least one of a wired or wireless communications link. At least one of the first electronic processor or the second electronic processor is configured to update the first GUI in response to user inputs at the second GUI. In other features, at least one of the first electronic processor or the second electronic processor is configured to update the second GUI in response to user inputs at the first GUI. In other features, the IVA platform is configured to be embedded within a vehicle.

In other features, at least one of the first electronic processor or the second electronic processor is configured to determine a signal strength of a wireless signal between the first communications interface and the second communications interface and, in response to determining that the signal strength is below a threshold, activate a lock screen on the first GUI. In other features, the user profile includes an associated workflow object, the associated workflow object includes a plurality of assigned task components. At least one of the first electronic processor or the second electronic processor is configured to render at least one of the first application or the second application on at least one of the first GUI or the second GUI based on one of the assigned task components.

In other features, the alert signal includes an associated updated workflow object, the associated updated workflow object includes an updated plurality of assigned task components. At least one of the first electronic processor or the second electronic processor is configured to select the third application based on one of the updated plurality of assigned task components. In other features, the mobile communication device includes a land mobile radio system transceiver.

A method includes accessing a user profile using at least one of a first electronic processor of an in-vehicle assistant (IVA) platform or a second electronic processor of a mobile communication device, parsing the user profile to identify a set of applications authorized for use by the user profile, the set of applications including a first application and a second application, generating and rendering a first graphical user interface (GUI) on a first display of the IVA platform, generating and rendering a second GUI on a second display of the mobile communication device, and rendering the first application on the first GUI and not on the second GUI.

In other features, the mobile communication device includes a first communications interface and the mobile communications device is configured to receive the user profile from a dispatch platform via the first communications interface. In other features, the mobile communication device is configured to receive an alert signal from the dispatch platform via the first communications interface. The method includes, in response to the mobile communication device receiving the alert signal selecting a third application from among the set of applications authorized for use by the user profile based on the alert signal, and rendering the third application in a priority field of the first GUI.

In other features, the IVA platform includes a second communications interface, the mobile communication device includes a third communications interface, and the second communications interface is configured to be operatively coupled to the third communications interface via at least one of a wired or wireless communications link. The method includes updating the first GUI in response to user inputs at the second GUI. In other features, the method includes updating the second GUI in response to user inputs at the first GUI.

In other features, the IVA platform is configured to be embedded within a vehicle. In other features, the method includes determining a signal strength of a wireless signal between the second communications interface and the third communications interface and, in response to determining that the signal strength is below a threshold, activating a lock screen on the first GUI. In other features, the user profile includes an associated workflow object, the associated workflow object includes a plurality of assigned task components. The method includes rendering at least one of the first application or the second application on at least one of the first GUI or the second GUI based on one of the assigned task components.

In other features, the alert signal includes an associated updated workflow object, the associated updated workflow object includes an updated plurality of assigned task components and at least one of the first electronic processor or the second electronic processor is configured to select the third application based on one of the updated plurality of assigned task components. In other features, the mobile communication device includes a land mobile radio system transceiver.

Other examples, embodiments, features, and aspects will become apparent by consideration of the detailed description and accompanying drawings.

BRIEF DESCRIPTION OF THE DRAWINGS

FIG. 4 is an example lookup table showing applications and functionality of a mobile device that different user ranks are authorized to access, according to some aspects.

FIGS. 9A-9D are flowcharts of an example process for transforming graphical user interfaces of communications systems with dual-visual displays, according to some aspects.

FIG. 11 is a message sequence chart showing interactions between components of a public safety communications system as the system transforms displays of a mobile device and in-vehicle assistant platform, according to some aspects.

DETAILED DESCRIPTION

Figure 1:
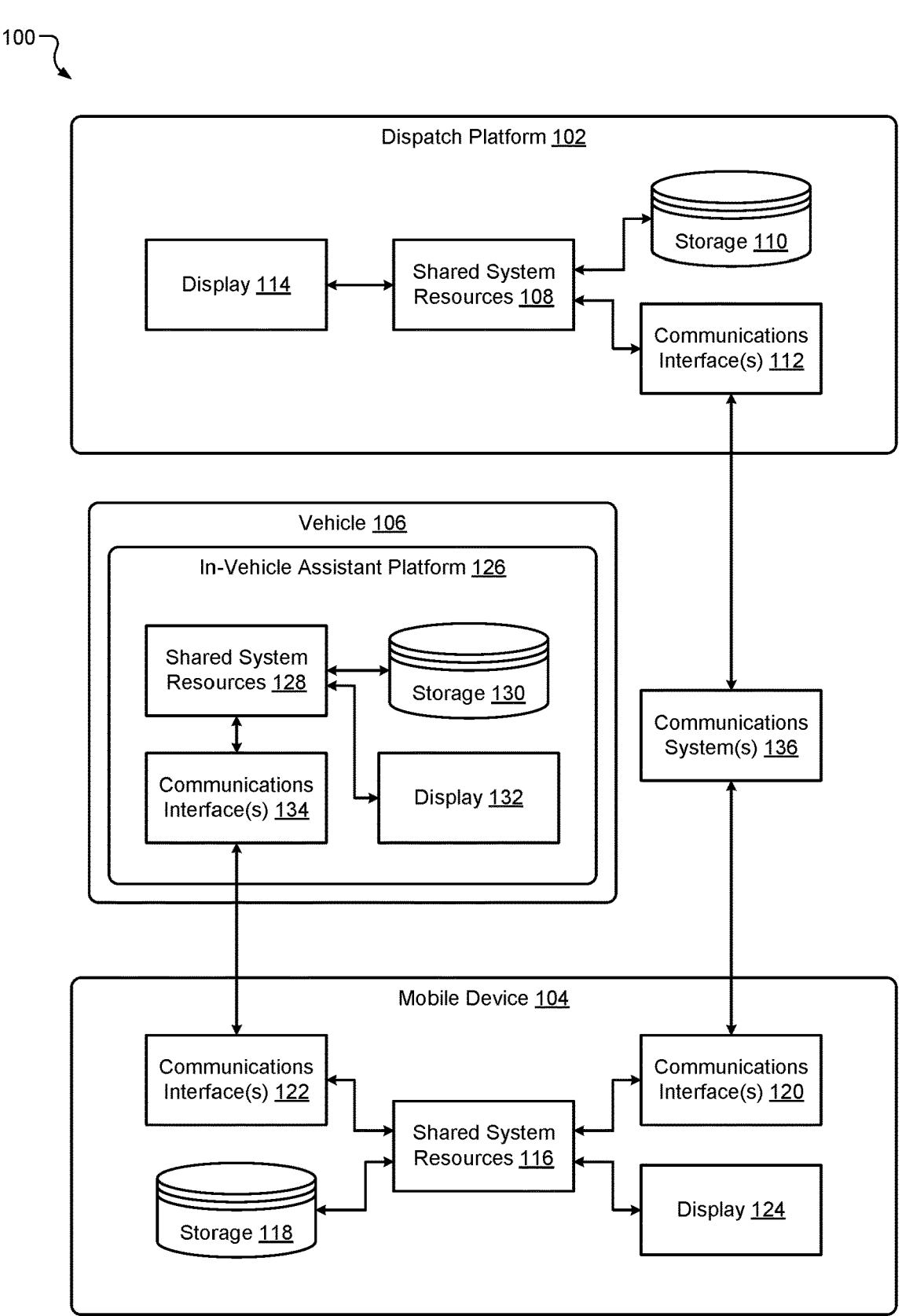
FIG. 1 is a block diagram of communications system, according to some aspects.

FIG. 1 is a block diagram of a communications system 100. The system 100 may be a public safety communications system, an enterprise communications system, or may be implemented in any other applicable setting as well. As shown in FIG. 1, some examples of the system 100 include one or more dispatch platforms, such as dispatch platform 102, one or more mobile communications devices, such as mobile device 104, and one or more vehicles, such as vehicle 106. As will be described further on in this specification, mobile device 104 may be linked to vehicle 106. In some examples, dispatch platform 102 includes shared system resources 108, one or more non-transitory computer-readable storage media—such as storage 110, one or more communications interfaces—such as communications interface(s) 112, and one or more displays—such as display 114.

In some embodiments, shared system resources 108 include one or more electronic processors, one or more graphics processing units, volatile computer memory, non-volatile computer memory, and/or one or more system buses interconnecting the components of the dispatch platform 102.

In various implementations, mobile device 104 includes shared system resources 116, one or more non-transitory computer-readable storage media—such as storage 118, one or more communications interfaces—such as communications interface(s) 120 and communications interface(s) 122, and one or more displays—such as display 124. In some embodiments, shared system resources 116 include one or more electronic processors, one or more graphics processing units, volatile computer memory, non-volatile computer memory, and/or one or more system buses interconnecting the components of the mobile device 104. In some examples, shared system resources 116 generate a graphical user interface on display 124. In some embodiments, display 124 includes a touchscreen, and a user can interact with the graphical user interface via the touchscreen. In various implementations, mobile device 104 includes one or more buttons and/or switches, and the user interacts with the graphical user interface via the one or more buttons and/or switches. For example, mobile device 104 may include one or more soft key buttons and/or switches that the user can manipulate to interact with elements rendered on the graphical user interface.

In some embodiments, vehicle 106 includes an in-vehicle assistant platform 126. The in-vehicle assistant platform 126 may be embedded within vehicle 106 and include shared system resources 128, one or more non-transitory computer-readable storage media—such as storage 130, one or more communications interfaces—such as communications interface(s) 134, and one or more in-vehicle displays—such as display 132. In some embodiments, shared system resources 128 include one or more electronic processors, one or more graphics processing units, volatile computer memory, non-volatile computer memory, and/or one or more system buses interconnecting the components of the in-vehicle assistant platform 126. In some examples, shared system resources 128 generate a graphical user interface on display 132. In some embodiments, display 132 includes a touchscreen, and the user may interact with the graphical user interface via the touchscreen. In various implementations, in-vehicle assistant platform 126 includes one or more buttons and/or switches, and the user may interact with the graphical user interface via the one or more buttons and/or switches. For example, in-vehicle assistant platform 126 may include one or more soft key buttons and/or switches that the user can manipulate to interact with elements rendered on the graphical user interface.

In some examples, dispatch platform 102 communicates with mobile device 104 via communications interface(s) 112 and communications interface(s) 120. For example, communications interface(s) 112 sends and receives signals to and from communications interface(s) 120 over communications system(s) 136. In some embodiments, communications interfaces(s) 112 and communications interface(s) 120 include land mobile radio system transceivers and communications system(s) 136 operates according to a land mobile radio protocol. For example, the land mobile radio protocol may include the Project 25 (P25) standard developed by the Association of Public-Safety Communications Officials (APCO), the Terrestrial Trunked Radio (TETRA) specification, the Digital Mobile Radio (DMR) standard, the Next Generation Digital Narrowband (NXDN) standard, the Digital Private Mobile Radio (dPMR) standard, and/or the OpenSky standard.

In various implementations, communications interface(s) 112 and communications interface(s) 136 include broadband wireless link transceivers and communications system(s) 136 operates according to a broadband wireless link protocol. For example, the broadband wireless link protocol may include the Institute of Electrical and Electronics Engineers (IEEE) 802.11 standard (Wi-Fi), the IEEE 802.16 standard (WiMAX), the Long Term Evolution (LTE) standard, the 5G New Radio (NR) standard, the Code Division Multiple Access 2000 (CDMA2000) standard, the Evolved Packet Core (EPC) standard, and/or one or more satellite broadband protocols.

In some embodiments, mobile device 104 communicates with in-vehicle assistant platform 126 via communications interface(s) 122 and communications interface(s) 134. For example, communications interface(s) 122 and communications interface(s) 134 communicate over a wired Universal Serial Bus (USB) connection, a wireless Bluetooth connection, and/or a wireless Wi-Fi connection.

Figure 2:
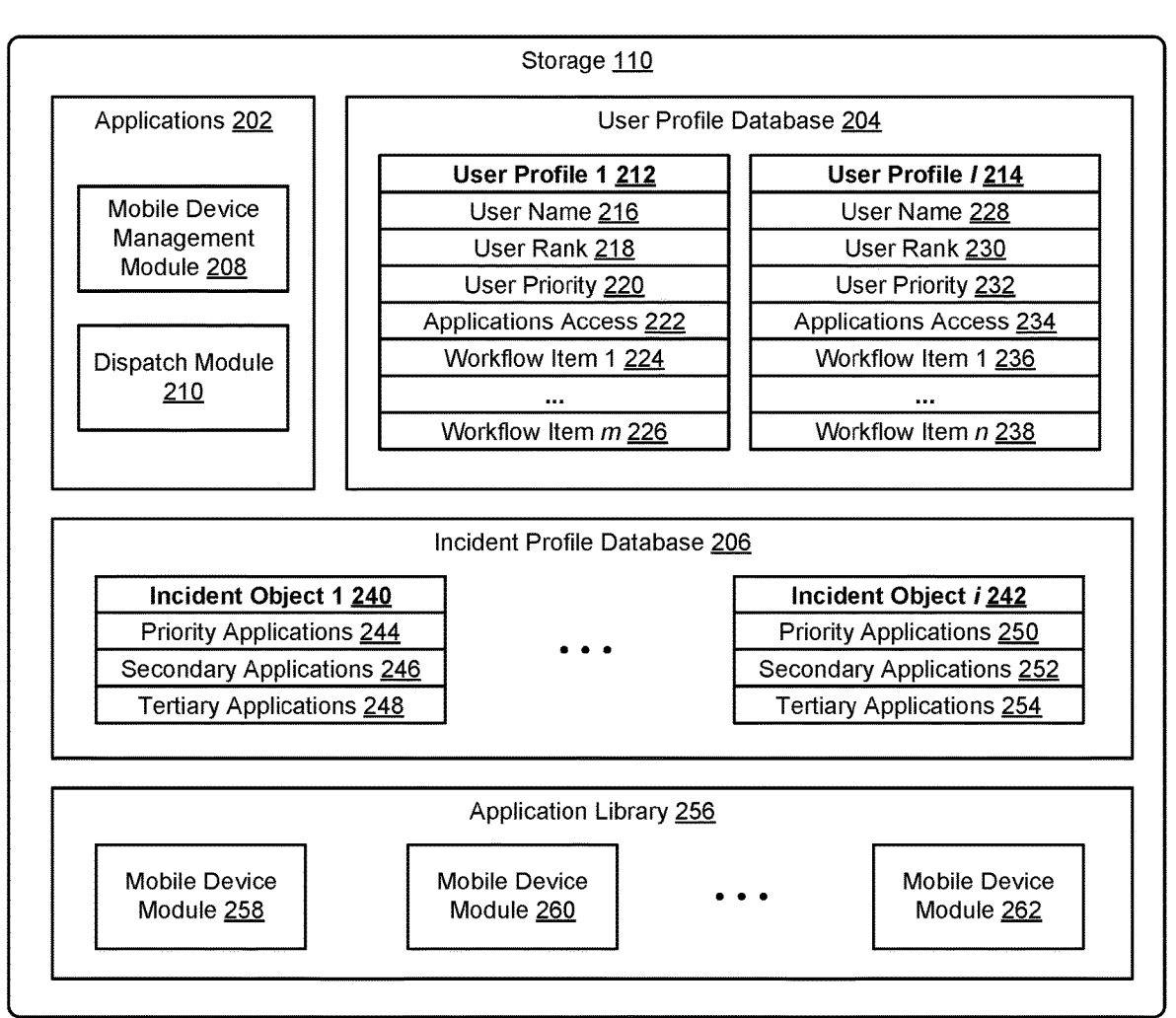
FIG. 2 is a block diagram showing example data objects that may be stored in non-transitory computer-readable storage media at a dispatch platform, according to some aspects.

FIG. 2 is a block diagram showing example data objects that may be stored in storage 110 of dispatch platform 102. In various implementations, storage 110 includes one or more applications 202, one or more user profile databases—such as user profile database 204, and one or more incident profile databases 206. Applications 202 may include one or more applications for managing mobile device(s) 104 of system 100 (such as mobile device management module 208) and one or more applications for sending messages to mobile device(s) 104 of system 100 (such as dispatch module 210). Applications module 202 may also include other applications for supporting mobile device operations. Additional applications may include, but are not limited to, mapping applications that prioritize various routes to a destination, criminal records access/query applications, sensor specific applications for accessing sensor data, office and productivity applications, license plate reader/warrant query applications, and/or proximity status/alert indicator applications.

User profile database 204 may include at least one user profile 212 that is active and associated with the current operator of mobile device 104. In various implementations, user profile database 204 includes multiple user profiles for different users, such as user profiles 212 and 214. While only two user profiles are shown in FIG. 2, user profile database 204 may include any number 1 of user profiles. Each user profile in profile database may be affiliated with a unique operator of mobile device 104, and may be used to facilitate time-sharing of a single mobile deice between multiple users. In various implementations, each user profile includes a user name data object (e.g., user name 216 or user name 228) that is unique to a specific mobile device operator, a user rank data object (e.g., user rank 218 or user rank 230) indicating the user's rank or responsibility within an organization, a user priority data object (e.g., user priority 220 or user priority 232) indicating the user's priority in the system 100, an applications access data object (e.g., applications access 222 or applications access 234) indicating which applications on the mobile device 104 and/or in-vehicle assistant platform 126 the user is authorized to access, and one or more workflow item data objects that include tasks for the user to perform (e.g., workflow items 224-226 or workflow items 236-238).

In various implementations, each workflow item data object includes priority assignments for the applications of the mobile device 104 and/or in-vehicle assistant platform 126. For example, each workflow item data object may include a list of priority applications, a list of secondary applications, and a list of tertiary applications. In some embodiments, workflow items 224 and 226 represent a plurality of individual tasks that form a workflow sequence assigned to the mobile device operator identified by user name 216. In like manner, workflow items 236 and 238 may represent individual work items that form assignments within a workflow process assigned to user name 228. Examples of a workflow process may include a patrol route where the workflow data objects include check-in locations assigned to a particular public safety officer. In various implementations, a workflow process may define a daily delivery route with assigned package deliveries identified by individual workflow data objects. Workflow items 224-226 and 236-238 may be different or similar to each other, with or without ordering constraints required for completion of each workflow data object. As shown in FIG. 2, in some examples, user profile 212 includes user name 216, user rank 218, user priority 220, applications access 222, workflow item 224. In various implementations, workflow item 226 and user profile 214 includes user name 228, user rank 230, user priority 232, applications access 234, workflow item 236, and workflow item 238.

In some embodiments, incident profile database 206 includes one or more incident data objects, such as incident objects 240 and 242. Incident profile database 206 may include an a priori categorization of different incident events that may be encountered by the mobile device user, or to which the mobile device user may be directed to respond. In various implementations, the timing of an incident occurrence does not need to be known, but the probability that a particular type of incident may occur can be estimated. For example, a highway patrol officer may not know when a traffic accident will occur or where, but there exists a high probability that a traffic accident will occur within a given patrol area and that the officer will need to respond. An incident profile may generally include incident severity, type, priority, range of effect on surrounding areas, and estimated resources appropriate for a response. Accordingly, while only two incident data objects are shown in FIG. 2, incident profile database 206 may include any number/of incident data objects. In various implementations, each incident data object includes a list of priority applications that are identified as appropriate for an anticipated event, as well as a list of secondary applications, and a list of tertiary applications. As shown in FIG. 2, in some examples, incident object 240 includes priority applications 244, secondary applications 246, and tertiary applications 248. In various implementations, incident object 242 includes priority applications 250, secondary applications 252, and tertiary applications 254. Incident object 240 applications 244-248 may be different from or the same as incident object 242 applications 250-254 depending on their utility to a particular incident. The purpose of the incident object may be to facilitate the presentation of relevant information pertinent to an incident onto a targeted display in an arrangement that is prioritized, understandable, and tailored to the individual viewer's responsibilities.

In some examples, storage 110 includes an application library 256. Application library 256 may include one or more applications—such as mobile device modules 258-262—that may be transmitted to storage 118 of mobile device 104. For example, mobile device management module 208 may select one or more of mobile device modules 258-262 to transmit to storage 118 based on the user profile associated with a particular mobile device. While only three mobile device modules are illustrated in FIG. 2, application library 256 may include any number of mobile device modules. In various implementations, the mobile device modules may include the applications that will be described below with reference to storage 118 of FIG. 3.

Figure 3:
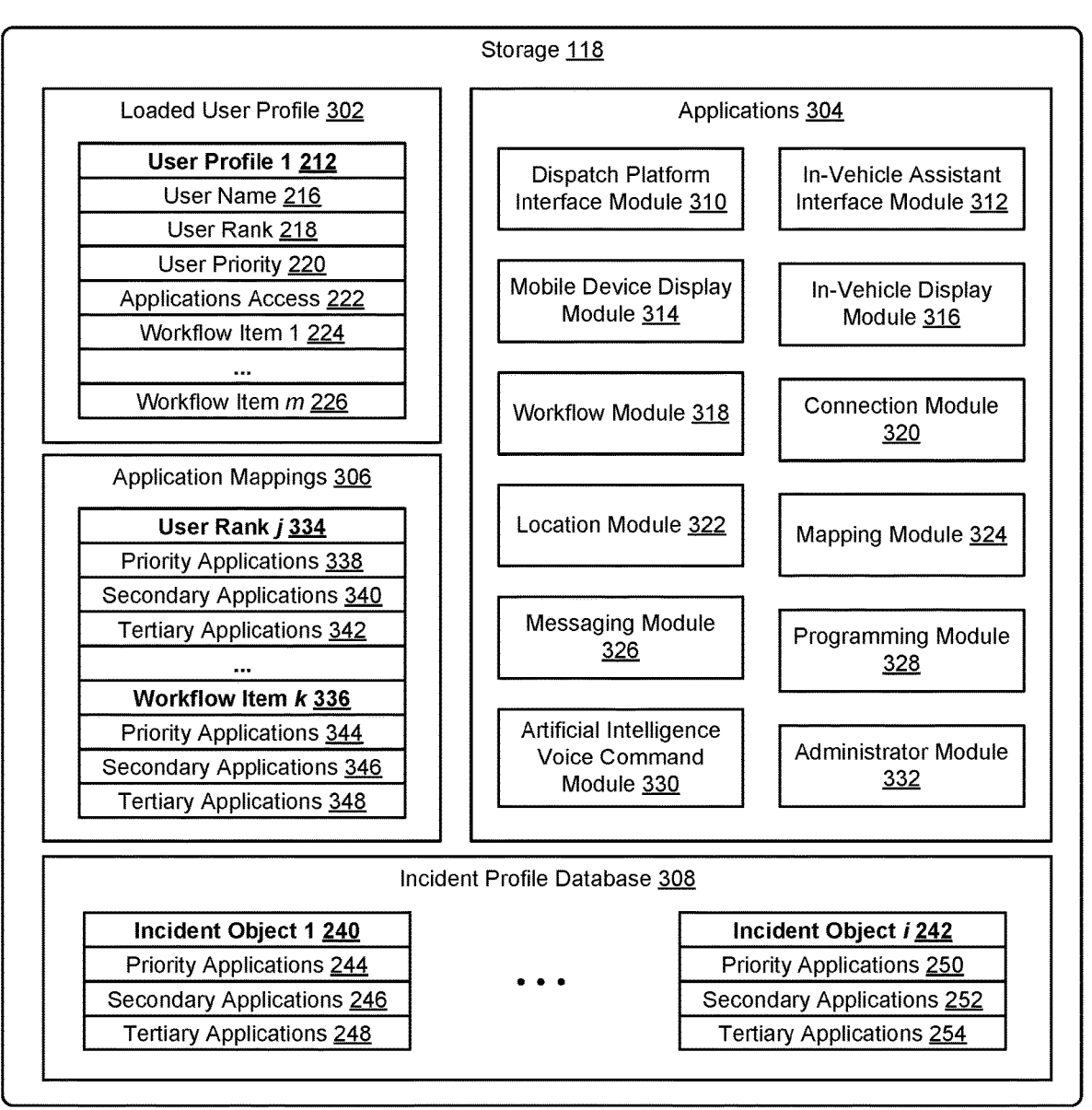
FIG. 3 is a block diagram showing example data objects that may be stored in non-transitory computer-readable storage media at a mobile device, according to some aspects.

FIG. 3 is a block diagram showing example data objects that may be stored in storage 118 of mobile device 104. In some embodiments, storage 118 includes a loaded user profile 302 that identifies the mobile device operator that is stored in the mobile device 104 when the device is issued to the operator. In addition, storage 118 may also include one or more applications 304, one or more application mappings 306, and an incident profile database 308. In various implementations, a user profile from storage 110 may be loaded into storage 118—for example, via communications interface(s) 112, communications system(s) 136, and communications interface(s) 120. In the example of FIG. 3, user profile 212 from user profile database 204 is loaded into storage 118 as loaded user profile 302. In various implementations, applications 304 include dispatch platform interface module 310, in-vehicle assistant interface module 312, mobile device display module 314, in-vehicle display module 316, workflow module 318, connection module 320, location module 322, mapping module 324, messaging module 326, programming module 328, artificial intelligence voice command module 330, and administrator module 332. In various implementations, each of these applications may be pre-loaded into storage 118, or may be loaded into the mobile device 104 as needed via communications interface(s) 112, communications system(s) 136, and communications interface(s) 120.

Dispatch platform interface module 310 may receive user profiles and/or incident data objects from mobile device management module 208. In some embodiments, mobile device management module 208 accesses user profiles and/or incident data objects from storage 110 that are associated with the user of a mobile device 104 and sends the user profiles and/or incident data objects to the assigned mobile device 104 via communications interface(s) 112, communications system(s) 136, and communications interface(s) 120. In some examples, mobile device 104 may be directly connected to dispatch platform 102 using a physical interface (e.g., a USB-Global Core Accessory Interface [GCAI] cable) to access storage 110 when the user initially checks mobile device 104 out prior to being deployed. Once connected to dispatch storage 110, management module 208 accesses the appropriate user profiles and/or incident data objects assigned to the mobile device operator and sends the user profiles and/or incident data objects to the assigned mobile device. Mobile device dispatch platform interface module 310 then saves the received user profiles and/or incident data objects to storage 118.

In-vehicle assistant interface module 312 manages communications between mobile device 104 and in-vehicle assistant platform 126. For example, in-vehicle assistant interface module 312 pairs mobile device 104 to in-vehicle assistant platform 126 and manages communications between communications interface(s) 122 and communications interface(s) 134.

Mobile device display module 314 generates graphical user interfaces that are output on display 124 of mobile device 104. In-vehicle display module 316 generates graphical user interfaces that are output on display 132 of in-vehicle assistant platform 126. Workflow module 318 manages user workflows.

Connection module 320 manages mobile device communications between mobile devices 104 and/or dispatch platform 102 of the system 100. In various implementations, mobile device connection module 320 manages the communication between dispatch platform 102 and mobile device 104 by automatically switching communications system(s) 136 from a land mobile radio system to a broadband wireless link system, or from a broadband wireless link system to a land mobile radio system. In some embodiments, a dispatch platform processor (not shown) in shared system resources 108 manages the communications between mobile device 104 and dispatch platform 102 by activating a broadband wireless link instead of a land mobile radio system, or activating a land mobile radio link instead of a broadband wireless link. The selection of the particular system/protocol governing the link within communication system 136 may be performed to maintain an optimal connection between dispatch platform 102 and mobile device 104.

Location module 322 tracks the location of mobile device 104 and updates dispatch platform 102 and other mobile devices in the system 100 with the location information. In various implementations, location module 322 tracks the location of other mobile devices in the system 100. Location module 322 may generate a map and show the locations of mobile device 104 and other mobile devices operational within the system 100 on the map. The information generated by location module 322 may be used by mobile device display module 314 and shared resources 128 within in-vehicle assistant 126 to generate and output graphical representations of map and location information on display 124 and/or display 132 respectively.

Messaging module 326 allows mobile device 104 to communicate with dispatch platform 102 and other mobile devices in system 100 by sharing multimedia communications—such as via Short Messaging Service (SMS), Multimedia Messaging Service (MMS), and/or Rich Communication Services (RCS) and the like. In various implementations, messaging module 326 communicates with dispatch platform 102 and other mobile devices in system 100 over the broadband wireless link system to offload communication traffic from the mission-critical land mobile radio system.

Programming module 328 may allow mobile device 104 to be remotely updated by dispatch platform 102. For example, mobile device management module 208 receives updates to mobile device 104 from dispatch platform 102 via the broadband wireless link system. Programming module 328 then updates software on mobile device 104.

Artificial intelligence voice command module 330 may use artificial intelligence capabilities to interpret voice commands or queries and deliver appropriate functional responses or query results in an audible format. For example, users can speak natural language to perform a license plate or driver's license query, or search for vehicles based on vehicle identification numbers.

Administrator module 332 may allow dispatch system administrators to configure settings of mobile device 104. Applications 304 may also include modules that perform other functions (not shown), including regulating the accessibility of various applications by the mobile device based on pre-defined parameters such as the operator's user profile 302.

Application mapping module 306 may function to prioritize various applications accessible by the mobile device 104 based on multiple factors, including the user's organizational rank 334 and affiliated security clearance, the availability of applications within applications 304, and/or active work assignments (for example, determined based on the active workflow item 336). Accordingly, in various implementations, application mappings 306 includes one or more data objects that include application priority lists correlated to a user's rank (such as user rank 334) and one or more data objects that include application priority lists correlated to each workflow item within a workflow series that are assigned to the user profile (such as workflow item 336). For example, user rank 334 correlates to the user rank 218, and includes a list of priority applications 338, a list of secondary applications 340, and a list of tertiary applications 342. In some examples, workflow item 336 represents a k-th work element in a workflow sequence. Workflow item 336 may be associated with certain applications based on their usefulness in supporting the work activity. Therefore, workflow item 336 may include a list of priority applications 344, a list of secondary applications 346, and a list of tertiary applications 348.

Incident profile database 308 may map particular applications of applications 304 to corresponding types of anticipated emergency incidents that may be assigned to the operator of mobile device 104 based on the user profile 212, application availability, and/or the usefulness of an application to facilitate an appropriate incident response. After receiving an incident alert from dispatch platform 102, the current workflow item 336 may be suspended, and the mobile device operator may be tasked with responding in real-time to the incident alert (e.g., an officer on patrol may be tasked to respond to a traffic accident, or emergency medical personnel may be tasked to respond to a medical emergency at a domestic home). Accordingly, in various implementations, incident profile database 308 includes incident data objects loaded from incident profile database 206, such as incident objects 240 and 242. Incident object 240 and 242 may represent different types of incidents that necessitate different application prioritizations to support appropriate incident responses. In various implementations, mobile device management module 208 loads incident data objects from incident profile database 206, sends the loaded incident data objects to mobile device 104 via communications interface(s) 112, communications system(s) 136, and communications interface(s) 120, and dispatch platform interface module 310 saves the incident data objects to incident profile database 308. The incident objects 240 and/or 242 may be loaded into incident profile database 308 either upon reception of the incident alert or may be pre-loaded into incident profile database 308 when the user profile 302 is loaded into the mobile device 104 when the device is assigned to a particular operator, or a combination of both.

FIG. 4 is an example lookup table illustrating the accessibility of various applications 304 by mobile device 104 based on different user ranks 218. The example lookup table of FIG. 4 may be saved to each user profile—for example as applications access 222 and applications access 234—and/or saved as a separate data object in storage 110, storage 118, and/or storage 130. As shown in the example of FIG. 4, if the user rank in the user profile is "Officer," the user is excluded from accessing administrator module 332 and fleet map functionality 404 while being authorized to access mapping module 324, location module 322, messaging module 326, and voice call functionality 402 of mobile device 104. If the user rank in the user profile is "Supervisor," the user is excluded from administrator module 332, while being authorized access to mapping module 324, location module 322, messaging module 326, voice call functionality 402, and fleet map view functionality 404 of mobile device 104. If the user rank in the user profile is "Administrator," the user is authorized access to all available applications including administrator module 332, mapping module 324, location module 322, messaging module 326, voice call functionality 402, and fleet map view functionality 404 of mobile device 104. In various implementations, voice call functionality 402 includes the ability for the user to make and receive voice calls using cellular networks and/or broadband wireless link protocols. In some embodiments, fleet map view functionality 404 allows the user to view live geographic locations of other devices of system 100.

Figure 5:
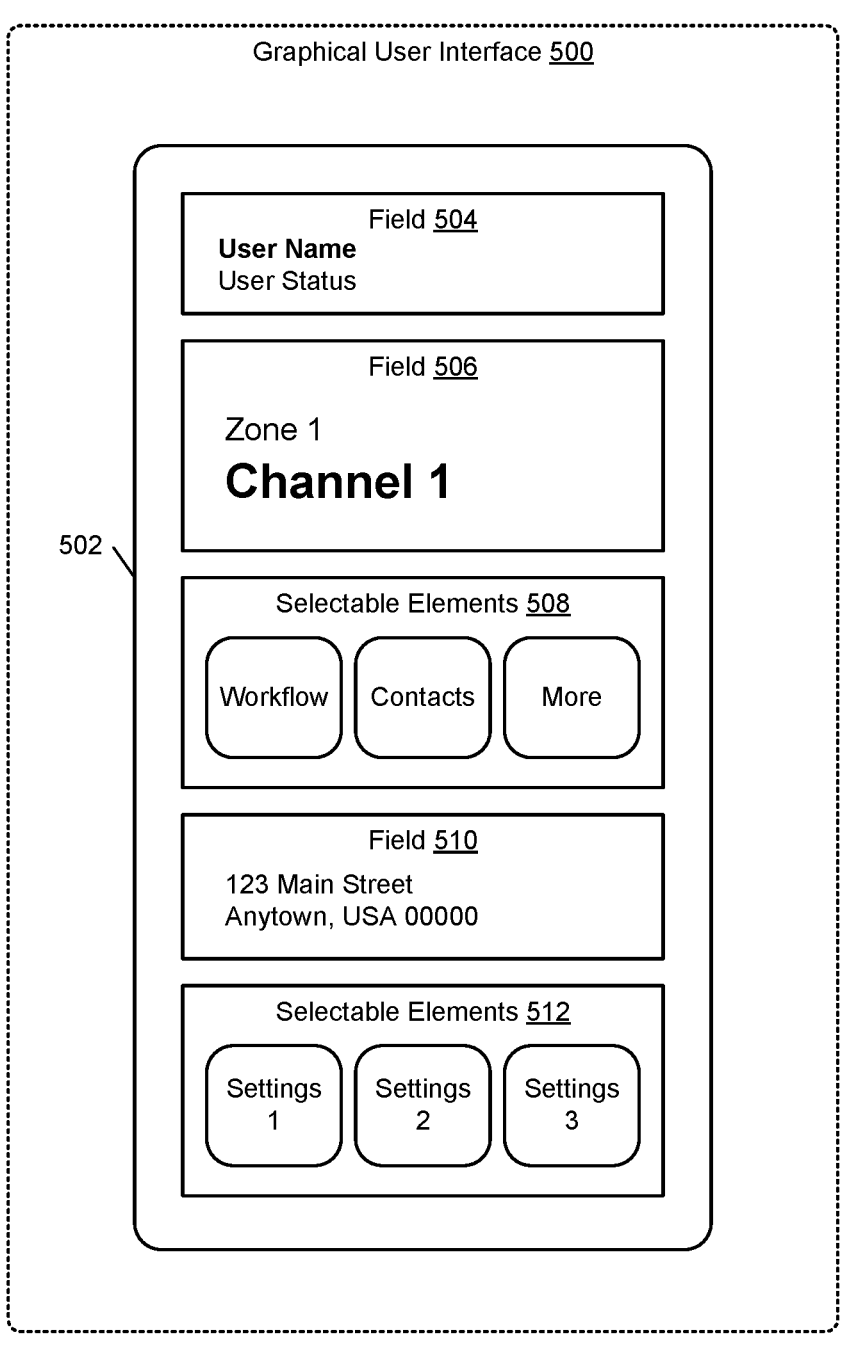
FIG. 5 shows a first screen of an example graphical user interface of a mobile device, according to some aspects.

FIG. 5 shows a first screen of an example graphical user interface 500. In various implementations, this first screen of graphical user interface 500 is dispatch radio centric, where telemetry associated with the operator of mobile device 104 and the communication system 136 is presented along with frequently activated applications that are needed to efficiently communicate with support personnel within an organization. When a mobile device operator selects a selectable element in field 508 or 512 (e.g., presses the "Contacts" icon image), interface 500 is updated to display an application corresponding to the selected icon in the selectable element field 508 or 512. In various implementations, the first screen of graphical user interface 500 may be rendered as an output on display 124 of mobile device 104. As shown in FIG. 5, various examples of graphical user interface 500 include a home screen 502. Home screen 502 includes field 504—which displays a user name and user status for the operator of mobile device 104. In addition, home screen 502 includes field 506—which displays the active communication system 136 configuration of mobile device 104 (such as the active "Zone 1" representative of a specific talkgroup cluster of channels and "Channel 1" indicating the active land mobile radio communication channel of mobile device 104. Finally, home screen 502 may also include selectable elements 508 (e.g., showing menu-button access to activate priority applications), field 510 (which shows an approximate street address location of mobile device 104), and selectable elements 512 (showing soft-key access buttons for prioritized applications and/or mobile device configuration control [e.g., alert tone, display brightness, alarm, etc.]).

Figure 6:
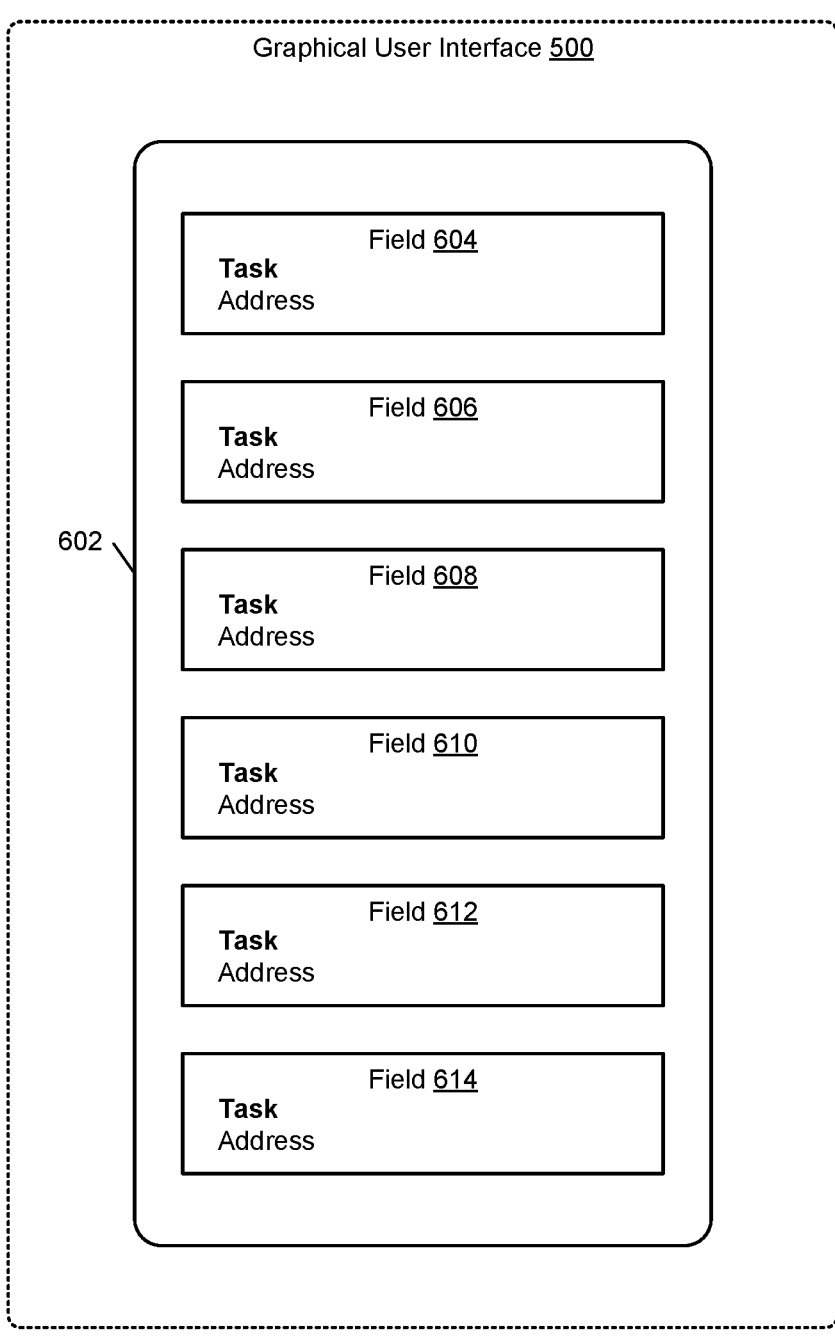
FIG. 6 shows a second screen of an example graphical user interface of a mobile device, according to some aspects.

FIG. 6 shows a second screen of example graphical user interface 500. In various implementations, this second screen of graphical user interface 500 is workflow centric where each individual workflow item has a particular task/address header displayed on interface 500. When the user selects a task/address header (e.g., presses a task/address icon image), interface 500 may be updated to display a set of applications associated with the particular workflow item (such as workflow item 336) as defined by application mapping module 306. Some implementations of the second screen of graphical user interface 500 may be rendered on display 124 of mobile device 104 as the default display presentation. As shown in FIG. 6, examples of graphical user interface 500 include a task screen 602. In various implementations, workflow module 318 generates task screen 602 for display on interface 500 in response to the user first selecting a workflow element from selectable elements 508 of home screen 502. As shown in FIG. 6, task screen 602 may include one or more fields, such as fields 604-614. In various implementations, each field may include a specific task and an address associated with that task. In some embodiments, each field is associated with a workflow item in a user profile. For example, workflow item 224 of loaded user profile 302 may include a task and an address, and the task and address shown in field 604 may be generated based on the information in workflow item 224. Similarly, workflow item 226 of loaded user profile 302 may include a task and an address, and the task and address shown in next field 606 may be generated based on the information in workflow item 226.

Figure 7:
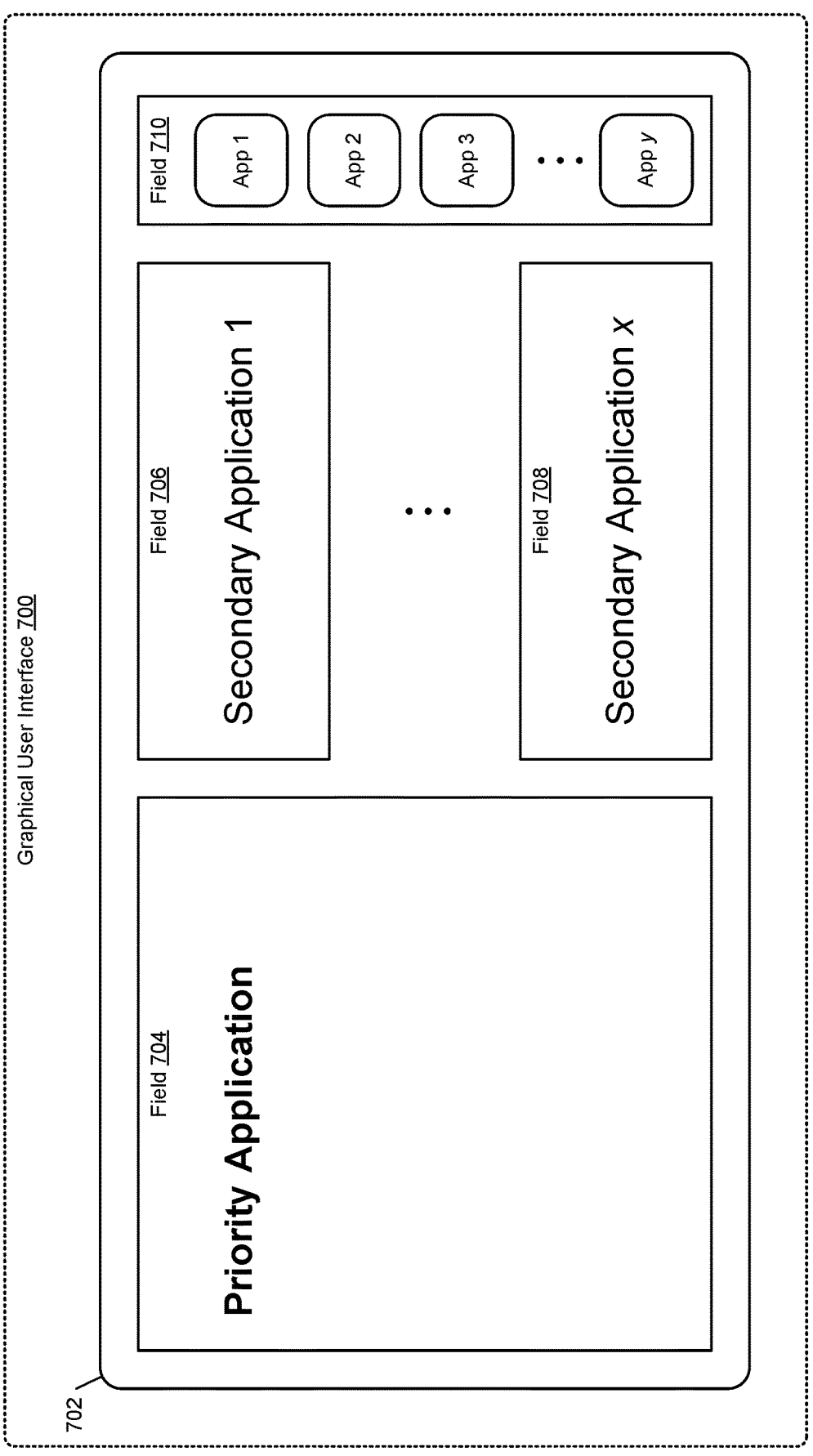
FIG. 7 shows a main screen of an example graphical user interface of an in-vehicle assistant platform, according to some aspects.

FIG. 7 shows a main screen of an example graphical user interface 700. In various implementations, graphical user interface 700 may be rendered and output to display 132. Display 132 may render an easily accessible graphical user interface that is complementary to display 124. In various implementations, information rendered on display 132 may be the same as or different from information rendered on display 124 (as may be warranted to facilitate information availability and situational awareness of the mobile device operator). In some embodiments, the determination of which applications are to be represented on display 132 and display 124 may be made by active applications of applications 304, mobile device display module 314, and/or in-vehicle display module 316. In other embodiments, the information presented on mobile device 104 display 124 is controlled by mobile device display module 314, and the information presented on vehicle display 132 is controlled by shared system resources 128 within in-vehicle assistant platform 126. Shared system resources 128 may determine the content displayed on graphical user interface 700 based on manual selection by the operator of prompts on the vehicle display 132 that indicate which applications are controllable by graphical user interface 700. In other examples, the selection of the content displayed on graphical user interface 500 and graphical user interface 700 is controlled by a combination of manual prompt selections and application running on mobile device 104.

As shown in FIG. 7, some examples of graphical user interface 700 include a main screen 702. In some embodiments, main screen 702 displays a priority application in field 704 and one or more secondary applications in one or more secondary fields, such as fields 706-708. While only two secondary applications are shown in FIG. 7, any number x of secondary applications may be displayed in secondary fields. In various implementations, selectable icons corresponding to applications 304 are generated in field 710. While only four selectable icons are shown in FIG. 7, field 710 may include any number y of selectable icons. The determination of which applications are represented in priority application field 704, secondary application fields 706-708 and icon field 710 may be implemented according to priorities previously described with reference to application mappings 306 and/or incident profile database 308. For example, priority applications 338 and 344 may be mapped to priority field 704. In like manner, secondary applications 340 and 346 may be mapped to secondary application fields 706-708, and tertiary applications 342 and 348 may be mapped to icon field 710. Should an incident alert be received by mobile device 104, graphical user interface 700 may be updated using the appropriate application priorities corresponding to the incident (such as application priorities of incident objects in incident profile database 206).

Figure 8:
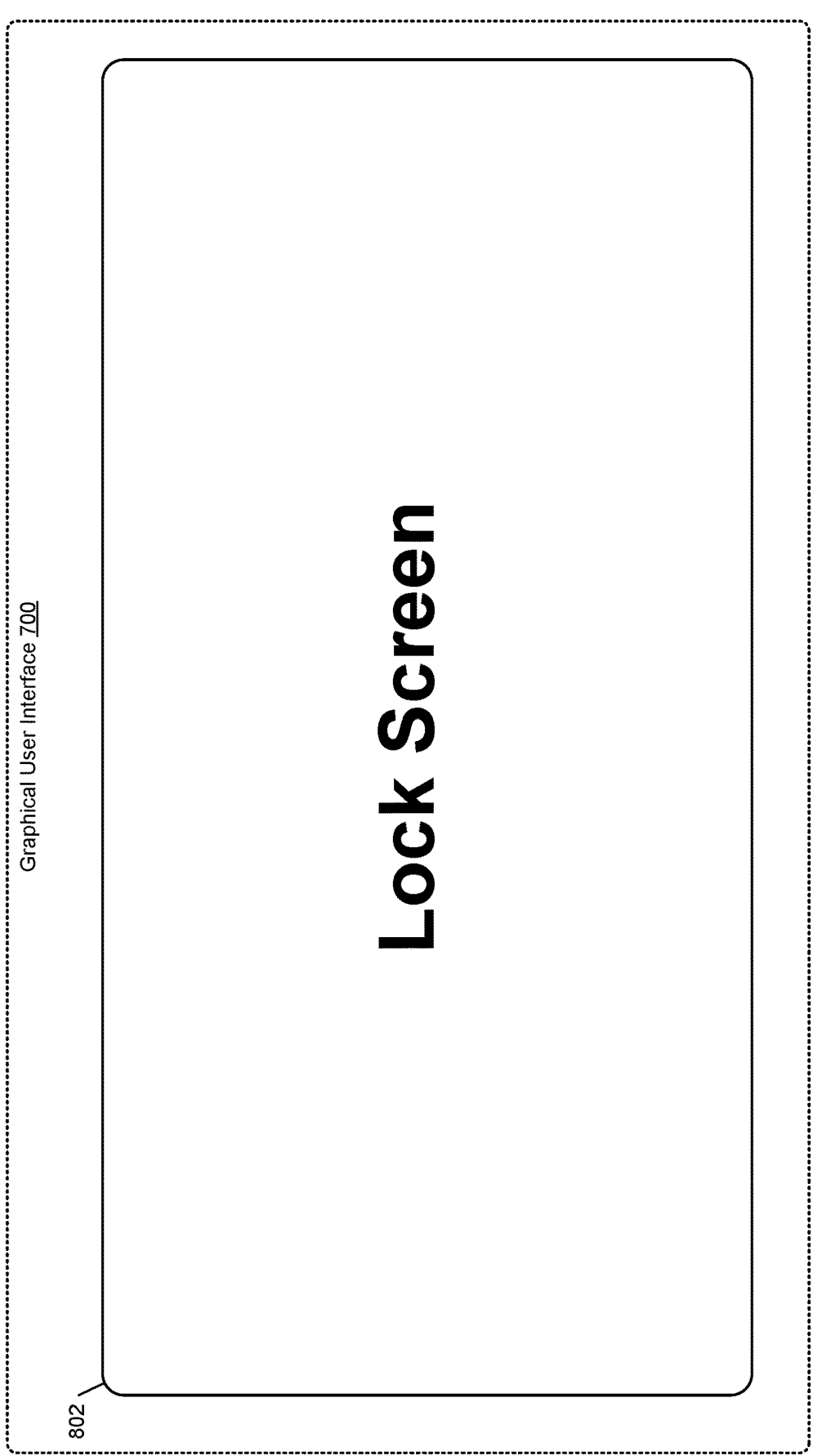
FIG. 8 shows a lock screen of an example graphical user interface of an in-vehicle assistant platform, according to some aspects.
Figure 9B:
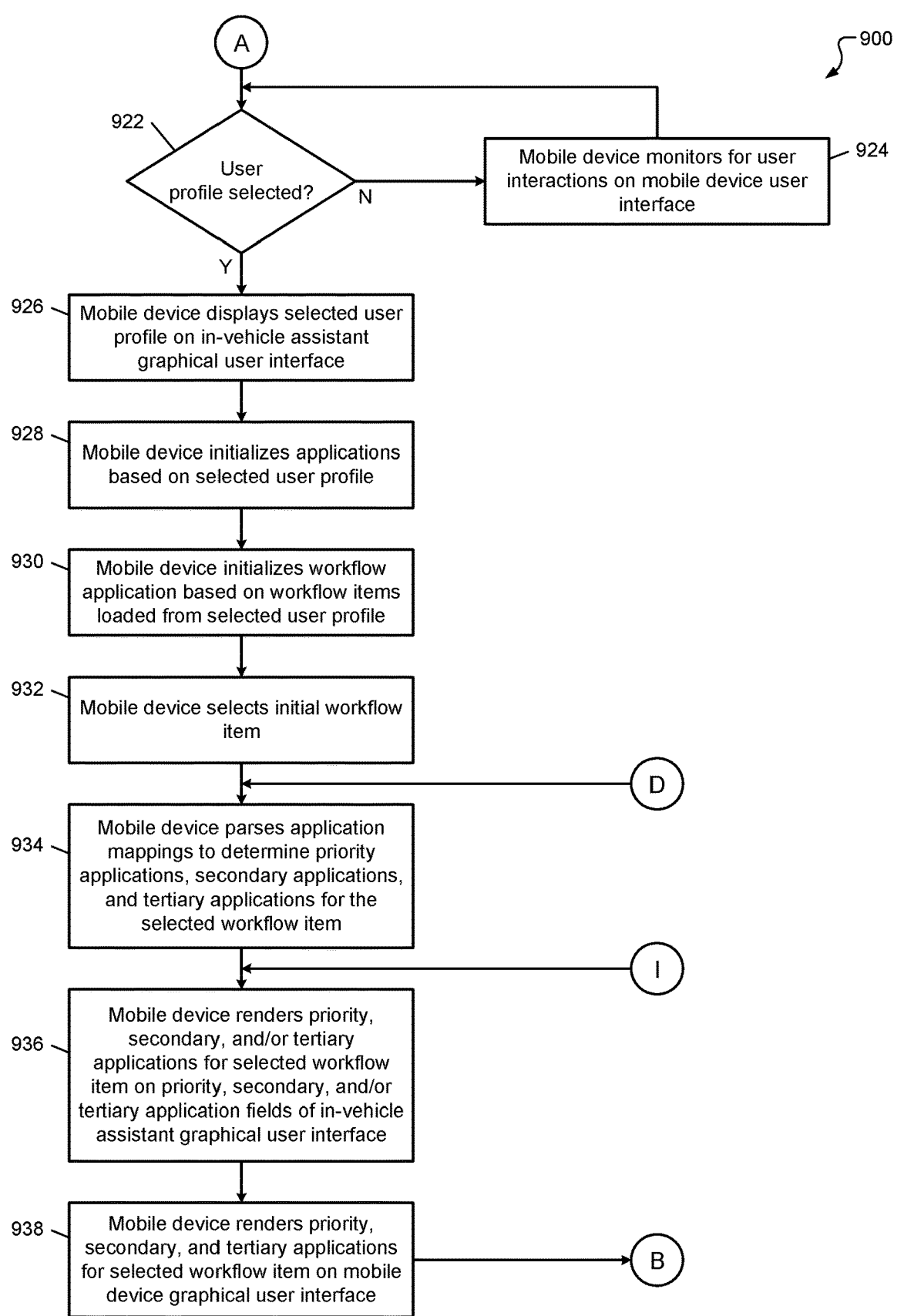
Figure 9C:
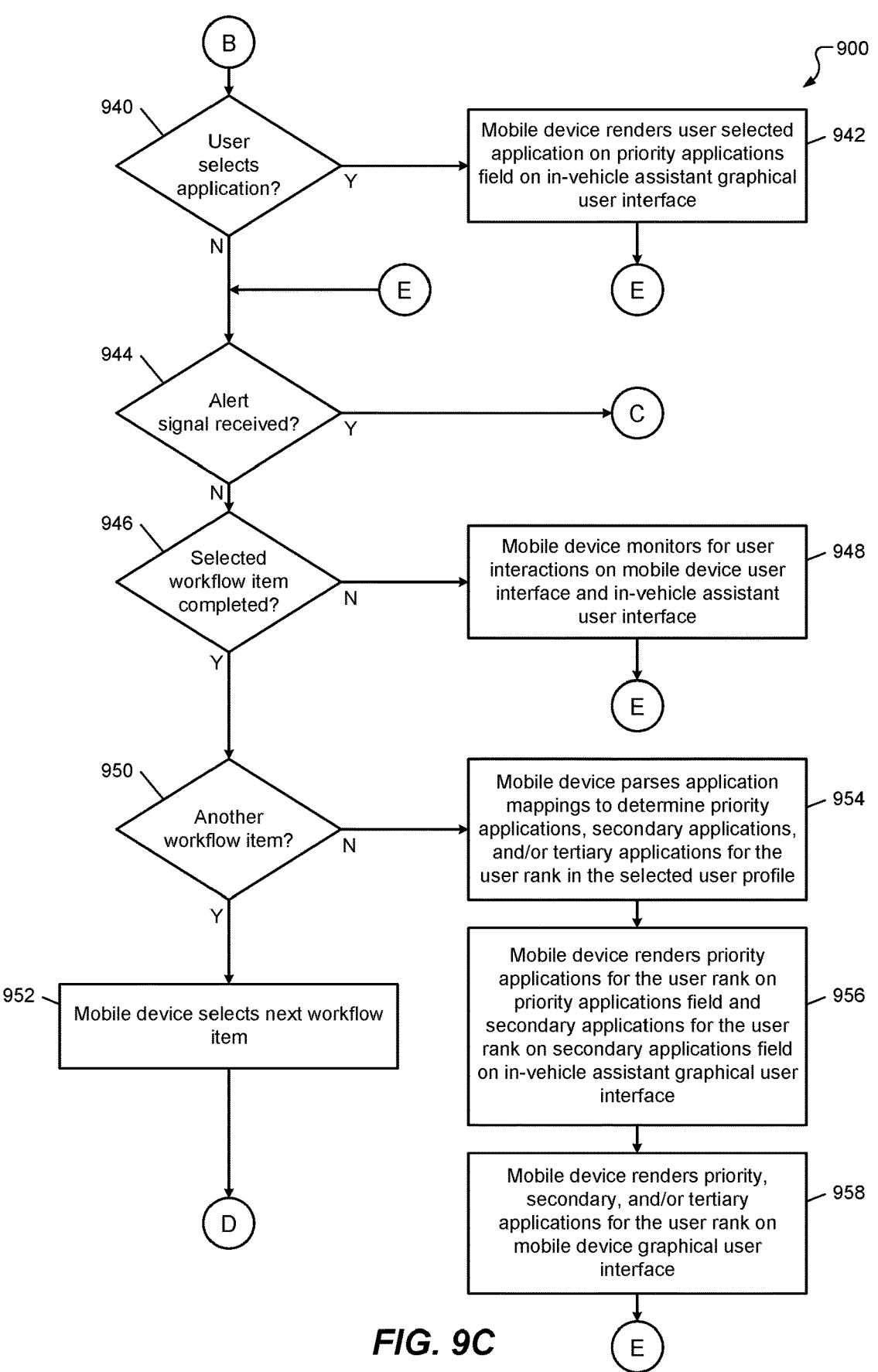
Figure 9D:
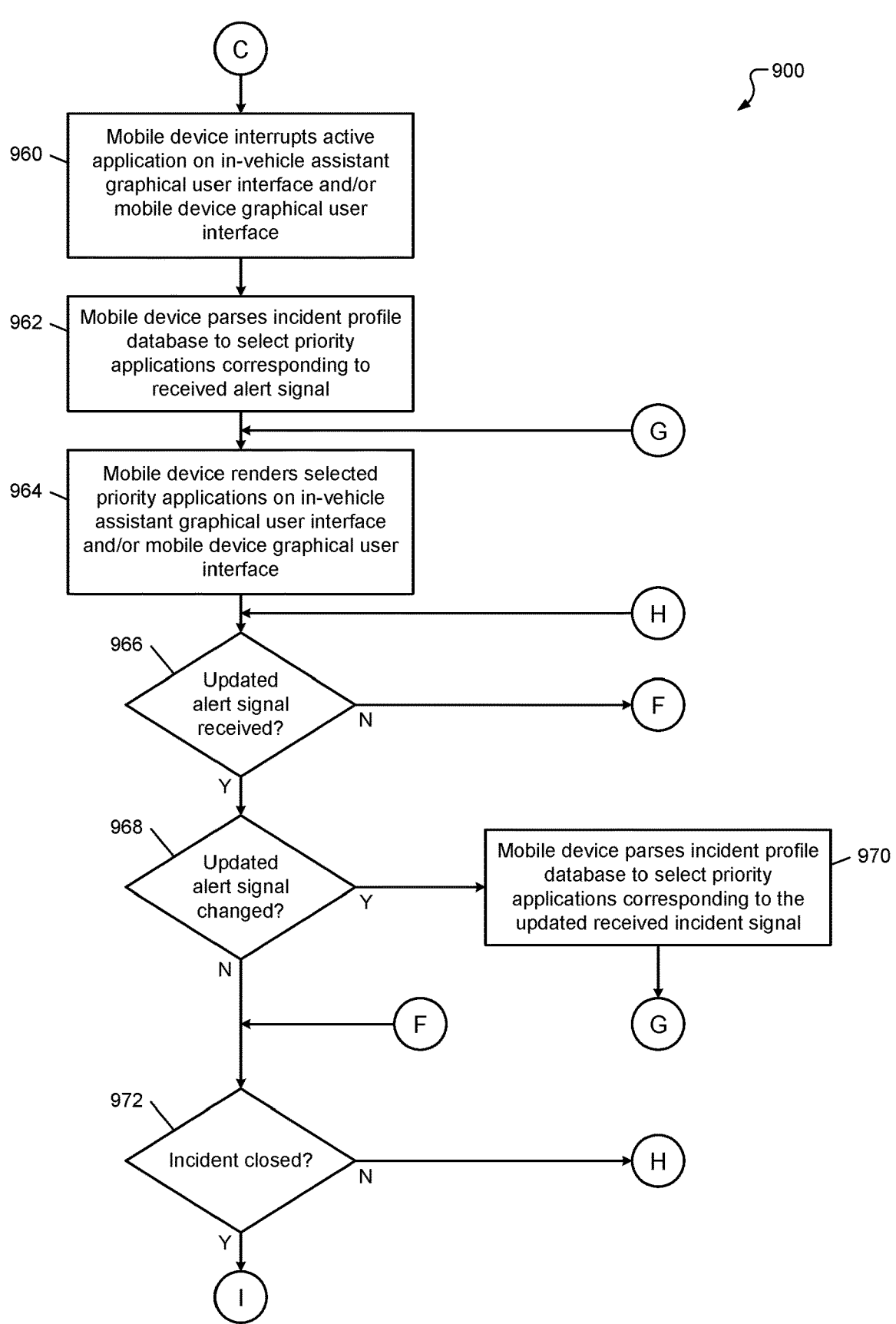

FIG. 8 shows a lock screen 802 of example graphical user interface 700. In some embodiments, activating lock screen 802 prevents users from interacting with in-vehicle assistant platform 126. In some embodiments, mobile device 104 makes a determination that the mobile device operator is exiting vehicle 106, or otherwise is no longer in visual range of the vehicle display 132. In these circumstances, in-vehicle assistant platform 126 activates lock screen 802. which hides all applications (and their associated information) on display 132, disables all active graphical user interface 700 prompts, and renders the lock screen 802 on graphical user interface 700.

FIGS. 9A-9D are flowcharts of an example process 900 for transforming graphical user interfaces of communications systems with dual-visual displays. At 902, vehicle 106 completes its startup sequence. At 904, an in-vehicle assistant platform—such as in-vehicle assistant platform 126—performs its startup sequence. At 906, in-vehicle assistant interface module 312 monitors communications interface(s) 122 to determine whether mobile device communications interface(s) 122 detects a communications signal from vehicle communications interface(s) 134. In response to the in-vehicle assistant interface module 312 not detecting the communications signal from vehicle communications interface(s) 134 ("NO" at decision block 906), in-vehicle assistant interface module 312 does not initialize in-vehicle assistant platform 126 and in-vehicle assistant platform remains locked at 908. At 910, in-vehicle assistant interface module 312 continues monitoring communications interface(s) 122 for the communications signal from communications interface(s) 134 and proceeds back to decision block 906.

In response to in-vehicle assistant interface module 312 detecting the communications signal at communications interface(s) 122 ("YES" at decision block 906), in-vehicle assistant interface module 312 establishes a secure communications channel with in-vehicle assistant platform 126 at block 912. In various implementations, the secure communications channel is established at 912 between communications interface(s) 122 and communications interface(s) 134. At 914, in-vehicle assistant interface module 312 and/or in-vehicle display module 316 generates a safety notice on graphical user interface 700 and renders the graphical user interface on display 132. In some embodiments, the safety notice presented on vehicle display 132 is generated by processors affiliated with shared system resources 128 as part of the protocol establishing a wireless link between in-vehicle platform 126 and mobile device 104. In various implementations, the safety notice includes safety information and selectable elements for the user to accept the safety notice. In response to the user not accepting the safety notice—for example, by not selecting the graphical user interface elements ("NO" at decision block 916), in-vehicle assistant interface module 312 and/or in-vehicle display module 316 continues monitoring graphical user interface 700 for user interactions at 918 and returns to decision block 916. In some embodiments, acceptance and/or acknowledgement of the displayed safety notification(s) is necessary for the operator to proceed to wirelessly link mobile device functions with the in-vehicle assistant platform 126. Refusal to acknowledge the safety information results in suspension of linkage operations between mobile device 104 and in-vehicle assistant platform 126, and display 132 may present messaging via graphical user interface 700 to indicate the suspension and/or termination of connectivity between the in-vehicle assistant platform 126 and mobile device 104.

In various embodiments, an appropriate user profile (such as one of user profiles 212 or 214) affiliated with the operator of mobile device 104 is identified to facilitate wirelessly linking the mobile device to in-car assistant platform 126. Accordingly, in response to the user accepting the safety notice—for example, by selecting the graphical user interface elements ("YES" at decision block 916), in-vehicle assistant interface module 312 and/or mobile device display module 314 prompts the user at block 920 to select the loaded user profile 302 at a graphical user interface of mobile device 104. For example, in-vehicle assistant interface module 312 and/or mobile device display module 314 displays user name 216 on graphical user interface 500 and prompts the user to confirm that user profile 212 is the correct user profile. In some embodiments, a single user profile is associated with the operator of mobile device 104 and is stored in the mobile device as loaded user profile 302 when the mobile device is issued to the operator. In other implementations, multiple user profiles may be loaded into loaded user profile 302 and graphical user interface 500 displays each of the user profiles of loaded user profile 302. The mobile device operator may select the correct user profile via graphical user interface 500 and may subsequently be required to unlock access to the selected user profile through authentication (such as by entering a PIN, entering a password, completing biometric authentication, and/or completing a multi-factor authentication process). At decision block 922, in-vehicle assistant interface module 312 and/or mobile device display module 314 monitors user interactions on graphical user interface 500 and determines whether a user profile is selected. In response to determining that a user profile is not selected ("NO" at decision block 922), in-vehicle assistant interface module 312 and/or mobile device display module 314 continues monitoring for user interactions on graphical user interface 500 at 924 and proceeds back to decision block 922.

In response to determining that a user profile is selected ("YES" at decision block 922), in-vehicle assistant interface module 312 and/or in-vehicle display module 316 displays the selected user profile on graphical user interface 700. For example, in response to selecting user profile 212, in-vehicle display module 316 renders user name 216 and/or any other appropriate information affiliated with loaded user profile 302 on graphical user interface 700. At 928, workflow module 318 initializes applications from applications block 304 based on the selected user profile for appropriate tandem presentation on graphical user interfaces 500 and 700. For example, in response to user profile 212 being selected, workflow module 318 parses user rank 218 and/or applications access 222 to determine which of applications 304 the user profile 212 is authorized to access and initializes those applications. At 930, workflow module 318 initializes and/or refreshes graphical user interface 500 to reflect the linkage between mobile device 104 and in-vehicle assistant platform 126. Workflow module 318 may also initialize graphical user interface 500 based on workflow items—such as workflow items 224-226—present in loaded user profile 212. For example, workflow module 318 loads each of workflow items 224-226 and mobile device display module 314 and/or workflow module 318 renders each loaded workflow item as a field on task screen 602. The same workflow items may be also presented on main screen 702 in the appropriate priority field as set by application mapping module 306. In various implementations, a given workflow item and/or application may be prioritized differently on graphical user interface 700 as compared to graphical user interface 500.

At 932, workflow module 318 selects the initial workflow item from user profile 212. In various implementations, mobile device display module 314 and/or workflow module 318 monitors user interactions with the task screen 602 and selects the workflow item associated with the field selected by the user as the initial workflow item. In some embodiments, workflow module 318 automatically selects a highest priority workflow item as the initial workflow item. In tandem with updates to mobile device task screen 602, in-vehicle display module 316 and/or workflow module 318 may also be responsive to user interactions with main screen 702 and selects the workflow item associated with the field selected by the user. Whether the user selects a workflow item on task screen 602 and/or main screen 702, both screens are appropriately updated and/or refreshed to reflect the user choice on either screen by in-vehicle assistant interface module 312, mobile device display module 314, in-vehicle display module 316, and/or workflow module 318.

At 934, workflow module 318 parses application mappings 306 to determine priority applications, secondary applications, and tertiary applications for the selected workflow item. In some implementations, each workflow item is distinctly associated with various applications within applications 304 based on the application's usefulness (e.g., priority) in performing a workflow item. This workflow item particularity to certain applications may be dependent on, among other things, user rank 334 (which is generally related to rank 218), user priority 220, and which of graphical user interfaces 500 and/or 700 is best suited for case-of-use of an application. Accordingly, workflow module 318 parses application mapping 306 to identify which applications are best presented on a particular graphical user interface 500 and/or 700, and how the application should be prioritized on a graphical user interface in accordance with loaded user profile 302. For example, workflow module 318 determines a workflow item from application mappings 306 that matches the selected workflow item—such as workflow item 336—and parses priority applications 344 to determine which of applications 304 are priority applications for presentation on graphical user interface 700. In like manner, workflow module 318 parses secondary applications 346 to determine which of applications 304 are secondary applications, and parses tertiary applications 348 to determine which of applications 304 are tertiary applications appropriate for presentation in appropriate fields of graphical user interface 700. In addition, workflow module 318 may parse priority applications 344 to determine which of applications 304 are to be presented as priority applications on graphical user interface 500. In like manner, module 318 parses secondary applications 346 to determine which of applications 304 are secondary applications, and parses tertiary applications 348 to determine which of applications 304 are tertiary applications for presentation on appropriate fields of graphical user interface 500.

At 936, in-vehicle assistant interface module 312, in-vehicle display module 316, and/or workflow module 318 render the priority applications display in field 704 of main screen 702, the secondary applications in fields 706-708 of main screen 702, and selectable icons representing remaining applications in field 710 of main screen 702. At 938, mobile device display module 314 and/or workflow module 318 render priority applications on selectable element field 508, and secondary applications on selectable elements 512 of graphical user interface 500. At 940, in-vehicle assistant interface module 312, in-vehicle display module 319, and/or workflow module 318 determine whether the user selects one of the selectable icons representing applications in field 710 of main screen 702. In response to determining that the user selects one of the selectable icons ("YES" at decision block 940), in-vehicle assistant interface module 312, in-vehicle display module 316, and/or workflow module 318 render the selected application in priority field 704 of main screen 702 at block 942 and process 900 proceeds to decision block 944.

At decision block 944, dispatch platform interface module 310 and/or workflow module 318 monitor communications interface(s) 120 to determine whether an alert signal is received from dispatch platform 102. In response to determining that the alert signal is not received ("NO" at decision block 944), workflow module 318 determines whether the selected workflow item has been completed at 946. In response to determining that the selected workflow item has not been completed ("NO" at decision block 946), in-vehicle assistant interface module 312, mobile device display module 314, in-vehicle display module 316, and/or workflow module 318 monitor graphical user interfaces 500 and/or 700 for user interactions at 948 and the process proceeds back to decision block 944. In response to determining that the selected workflow item has been completed ("YES" at decision block 946), workflow module 318 determines whether another non-completed workflow item is present in user profile 212 at 950. In response to workflow module 318 determining that another non-completed workflow item is present in user profile 212 ("YES" at decision block 950), workflow module 318 selects the next workflow item at 952 and the process proceeds back to 934.

In response to workflow module 318 determining that another non-workflow item is not present in user profile 212 (e.g., all workflow items in user profile 212 have been completed—"NO" at decision block 950), workflow module 318 parses application mappings 306 to determine priority applications, secondary applications, and tertiary applications corresponding to the user rank from the loaded user profile at 954. For example, workflow module 318 determines that user rank 334 from application mappings 306 corresponds to user profile 212 and sets applications from priority applications 338 as priority applications, applications from secondary applications 340 as secondary applications, and applications from tertiary applications 342 as tertiary applications. At 956, in-vehicle assistant interface module 312, in-vehicle display module 316, and/or workflow module 318 render priority applications on field 704 of main screen 702 and secondary applications on fields 706-708 of main screen 702. At 958, mobile device display module 314 and/or workflow module 318 render priority application to selectable element 508 and secondary or tertiary applications on element field 512 of graphical user interface 500 and process 900 returns to decision block 944.

In response to dispatch platform interface module 310 and/or workflow module 318 determining that an alert signal is received at communications interface(s) 120 ("YES" at decision block 944), in-vehicle assistant interface module 312, mobile device display module 314, in-vehicle display module 316, and/or workflow module 318 interrupt active applications on graphical user interface 500 and/or graphical user interface 700—for example, with a notification that mobile device 104 received an alert signal—at 960. At 962, workflow module 318 parses incident profile database 308 to select priority applications, secondary applications, and tertiary applications corresponding to the received alert signal. In various implementations, workflow module 318 parses incident objects in incident profile database 308 and determines which incident object data corresponds to the alert signal. For example, in response to determining that incident object 240 corresponds to the alert signal, workflow module 318 prioritizes applications from a prior workflow item 336 priority listings (such as priority applications 344, secondary applications 346, and/or tertiary applications 348 as previously described), to priority listings specific to the incident object corresponding to the alert signal. For example, workflow module 318 sets applications from priority applications 244 of incident object 240 as priority applications, applications from secondary applications 246 as secondary applications, and applications from tertiary applications 248 as tertiary applications. In some examples, the alert signal includes updated workflow items with updated task components and application mappings (such as lists of primary, secondary, and tertiary applications associated with the updated tasks). Workflow module 318 may set priority, secondary, and tertiary applications based on the updated workflow items of the alert signal.

At 964, in-vehicle assistant interface module 312, mobile device display module 314, in-vehicle display module 316, and/or workflow module 318 operate to render the prioritized applications on graphical user interface 500 and graphical user interface 700. In some implementations, vehicle assistant interface module 312, mobile device display module 314, in-vehicle display module 316, and/or workflow module 318 renders the priority applications on field 704 of main screen 702, secondary applications on fields 706-708 of main screen 702, and tertiary applications on graphical user interface 500. In other implementations, in-vehicle assistant interface module 312, mobile device display module 314, in-vehicle display module 316, and/or workflow module 318 renders the priority applications on field 704, selectable elements field 508 of main screen 702, and home screen 502. As previously discussed, the applications displayed on the respective screens may or may not necessarily be identical. In addition, secondary applications may be rendered on fields 706-708 and element field 512 of main screen 702 and home screen 502, and tertiary applications may be rendered on field 710 of main screen 702.

At decision block 966, dispatch platform interface module 310 and/or workflow module 318 monitors communications interface(s) 120 to determine whether an updated alert signal is received from dispatch platform 102. In response to determining that an updated alert signal is received ("YES" at decision block 966), workflow module 318 analyzes the updated alert signal at block 968 and determines whether the updated alert signal is different from the previous alert signal received at block 944. In response to determining that the updated alert signal is changed ("YES" at decision block 968), workflow module 318 parses incident data objects in incident profile database 206 to select a different incident data object corresponding to the updated alert signal. For example, if incident object 242 corresponds to the updated alert signal, workflow module 318 sets applications from priority applications 250 as priority applications, applications from secondary applications 252 as secondary applications, and applications from tertiary applications 254 as tertiary applications and process 900 proceeds back to block 964. In some embodiments, workflow module 318 updates the application mappings 306 based on the updated workflow items of the updated alert signal that effect workflow item 336.

In response to determining that an updated alert signal is not received ("NO" at decision block 966), process 900 proceeds to decision block 972. In response to determining that the updated alert signal is not changed ("NO" at decision block 968), process 900 proceeds to decision block 972. At 972, workflow module 318 determines whether the incident has been closed. In response to determining that the incident has not been closed ("NO" at decision block 972), process 900 proceeds back to decision block 966. In response to determining that the incident has been closed, workflow module 318 recalls the pre-alert signal active workflow item from user profile 212 (e.g., workflow items 224-226) along with the application mappings of associated workflow item 336 and process 900 proceeds back to block 936.

Figure 10:
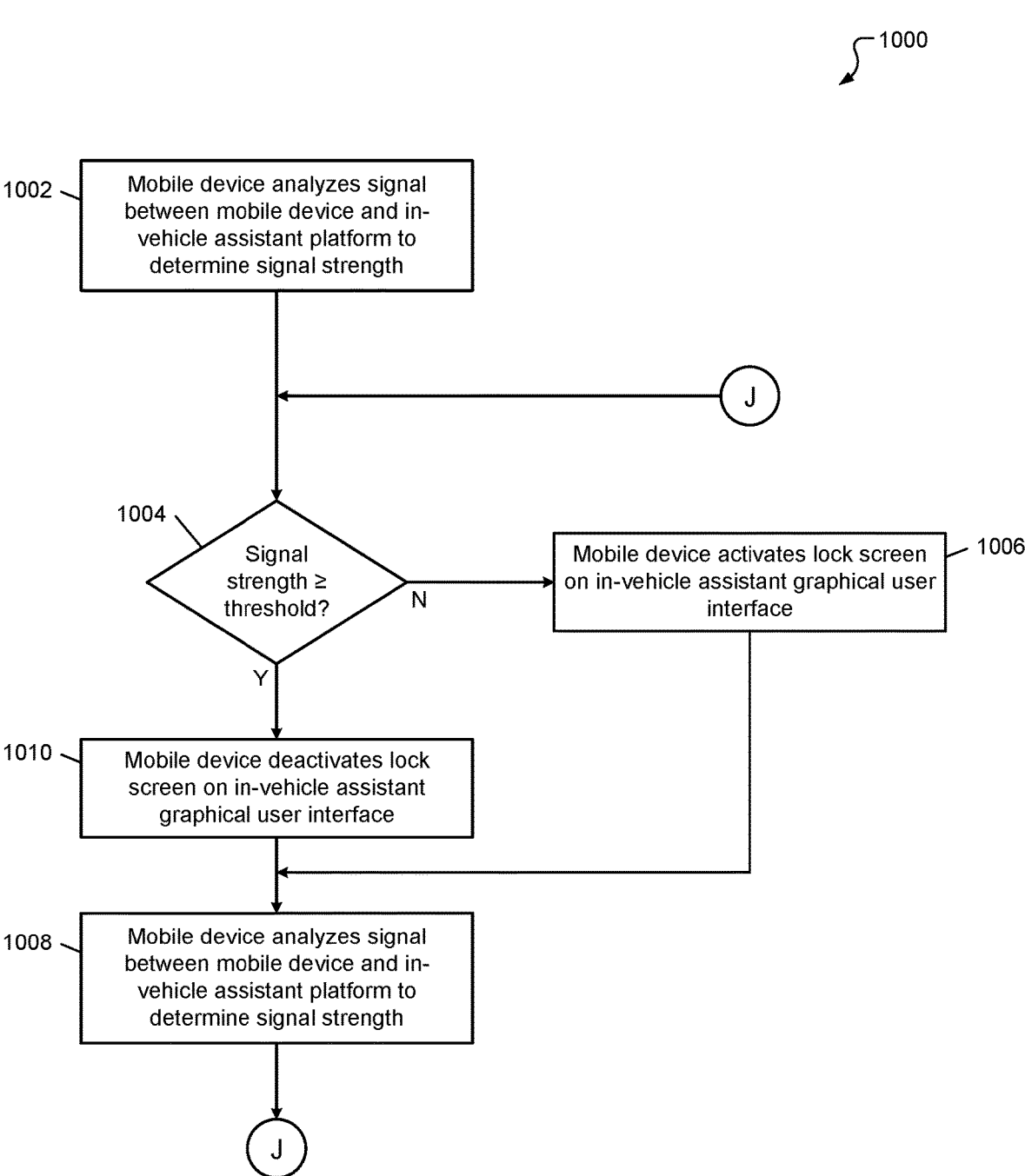
FIG. 10 is a flowchart of an example process for selectively generating a lock screen on a graphical user interface of an in-vehicle assistant platform, according to some aspects.

FIG. 10 is a flowchart of an example process 1000 for selectively generating lock screen 800 on graphical user interface 700 of in-vehicle assistant platform 126. At 1002, in-vehicle assistant interface module 312 analyzes mobile device communications interface(s) 122 to determine a signal strength of the wireless communications signal between communications interface(s) 122 and communications interface(s) 134. At decision block 1004, in-vehicle assistant interface module 312 determines whether the signal strength meets or exceeds a threshold. In response to determining that the signal strength does not meet or exceed the threshold ("NO" at decision block 1004), in-vehicle assistant interface module 312 and/or in-vehicle display module 316 generates lock screen 802 on graphical user interface 700 at block 1006 and process 1000 proceeds to block 1008. When graphical user interface 700 displays lock screen 802, all operator control of graphical user interface 700 screens may be suspended until wireless communications between communications interfaces 122 and 134 again exceeds a specified threshold. At block 1008, in-vehicle assistant interface module 312 again analyzes communications interface(s) 122 to determine the signal strength of the wireless communications signal between communications interface(s) 122 and communications interface(s) 134 and process 1000 proceeds back to decision block 1004.

In response to determining that the signal strength meets or exceeds the threshold ("YES" at decision block 1004), in-vehicle assistant interface module 312 and/or in-vehicle display module 316 deactivates lock screen 802 on graphical user interface 700 and process 1000 proceeds to block 1008. Upon deactivation of lock screen 802 on graphical user interface interface 700, in-vehicle display module 316 and/or workflow module 318 resumes management of the prioritized applications presented on graphical user interface 700 as previously described. In various implementations, deactivation of lock screen 802 at block 1010 occurs only if graphical user interface 700 is actively rendering lock screen 802 and the signal strength connecting communications interfaces 122 and 134 exceeds a threshold. If the signal strength between communications interfaces 122 and 134 continuously exceeds a threshold at decision block 1004 (continuous "YES" at decision block 1004), block 1010 maintains main screen 702 at interface 700 to sustain interoperability between mobile device 104 and in-vehicle assistant platform 126. In other implementations, the mobile device operator manually activates lock screen 802 through selection of prompts on graphical user interface 500 and/or depressing a preset mechanical button on mobile device 104 and/or in-vehicle assistant platform 126. These actions may trigger in-vehicle display module 316 to activate lock screen 802. The operator may also manually deactivate lock screen 802 using manual control systems on the mobile device 104

FIG. 11 is a message sequence chart 1100 showing interactions between components of the system 100 as the system 100 manages displays of the mobile device 104 and in-vehicle assistant platform 126. At 1102, communications interface(s) 134 of in-vehicle assistant platform 126 sends a communications signal to communications interface(s) 122 of mobile device 104. At 1104, mobile device 104 and in-vehicle assistant platform 126 establish a secure communications channel between communications interface(s) 122 and communications interface(s) 134. At 1106, mobile device 104 renders a safety notice on graphical user interface 700 at display 132 of in-vehicle assistant platform 126. At 1108, in-vehicle assistant platform 126 sends a signal to mobile device 104 indicating that the user accepts the safety notice. At 1110, mobile device 104 generates a graphical user interface prompt on graphical user interface 500— which is output to display 124—for the operator of the mobile device to select a user profile.

At 1112, the mobile device operator interacts with graphical user interface 500 to select a user profile. At 1114, mobile device 104 initializes applications based on the selected user profile. At 1116, mobile device 104 selects an initial workflow item from the selected user profile. At 1118, mobile device 104 determines application mappings based on the selected workflow item. At 1120, mobile device 104 selectively renders applications on graphical user interface 700 and/or graphical user interface 500 based on the application mappings. At 1122. dispatch platform 102 sends an alert signal to mobile device 104. For example, dispatch platform 102 sends the alert signal from communications interface(s) 112 to communications interface(s) 120 over communications system(s) 136. At 1124, mobile device 104 determines updated application mappings based on the alert signal. At 1126, mobile device 104 selectively renders the applications on graphical user interface 700 and/or mobile device graphical user interface 500 based on the updated application mappings. At 1128, mobile device 104 determines that the signal strength between communications interface(s) 122 incorporated into in-vehicle assistant platform 126 and mobile device communications interface(s) 134 is below a threshold. At 1130, mobile device 104 renders lock screen 802 on graphical user interface 700 and locks in-vehicle assistant platform 126.

Figure 12:
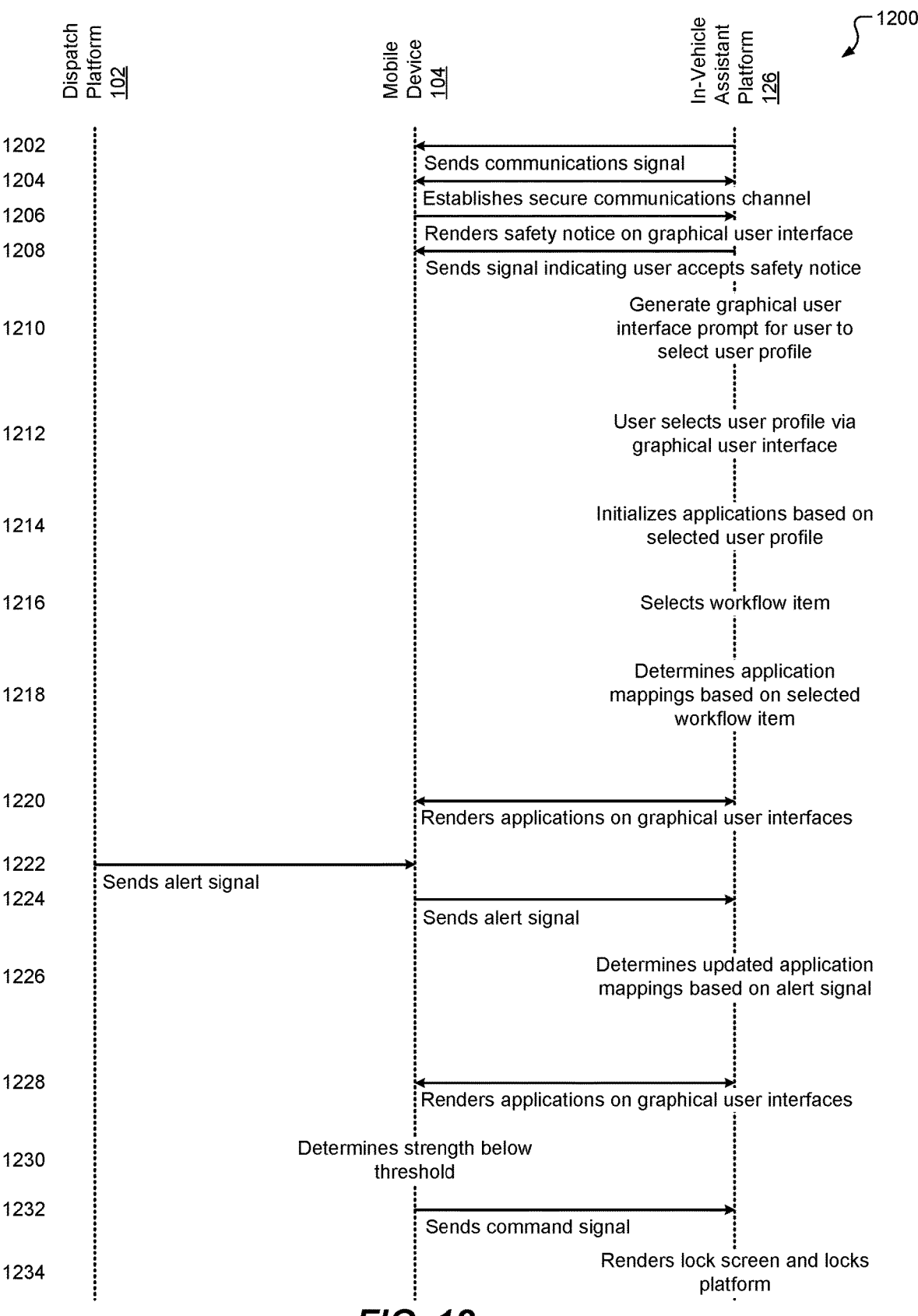
FIG. 12 is a message sequence chart showing interactions between components of a public safety communications system as the system transforms displays of a mobile device and in-vehicle assistant platform according to some aspects.

FIG. 12 is a message sequence chart 1200 showing interactions between components of the system 100 as the system 100 manages displays of the mobile device 104 and in-vehicle assistant platform 126. At 1202, communications interface(s) 134 of in-vehicle assistant platform 126 sends a communications signal to communications interface(s) 122 of mobile device 104. At 1204, mobile device 104 and in-vehicle assistant platform 126 establish a secure communications channel between communications interface(s) 122 and communications interface(s) 134. At 1206, mobile device 104 renders a safety notice on graphical user interface 700 at display 132 of in-vehicle assistant platform 126. At 1208, in-vehicle assistant platform 126 sends a signal to mobile device 104 indicating that the user accepts the safety notice. At 1210, in-vehicle assistant platform 126 generates a graphical user interface prompt on graphical user interface 700—which is output to display 132—for the mobile device operator to select a user profile.

At 1212, the user selects the user profile via graphical user interface 700 at in-vehicle assistant platform 126. At 1214, appropriate applications in storage 130 and/or shared system resources 128 on in-vehicle assistant platform 126 initializes applications based on the selected user profile. At 1216, applications in storage 130 and/or shared system resources 128 on in-vehicle assistant platform 126 selects a workflow item from the loaded user profile. At 1218, in-vehicle assistant platform 126 determines application mappings based on the selected workflow item so as to prioritize the applications for presentation on graphical user interface 700. At 1220, mobile device 104 and/or in-vehicle assistant platform 126 selectively render applications on graphical user interface 500 and graphical user interface 700 according to the application mappings. At 1222, dispatch platform 102 sends an alert signal to mobile device 104. For example, dispatch platform 102 sends the alert signal from communications interface(s) 112 to communications interface(s) 120 over communications system(s) 136. At 1224, mobile device 104 transmits the alert signal to in-vehicle assistant platform 126 through the wireless communication between communications interface 122 and communications interface 134. At 1226, applications in storage 130 and/or shared system resources 128 on in-vehicle assistant platform 126 determine updated application mappings based on the alert signal. At 1228, mobile device 104 and/or in-vehicle assistant platform 126 selectively renders applications on graphical user interface 500 and/or graphical user interface 700 based on the alert signal centric updated application mappings. At 1230, mobile device 104 determines that the signal strength between communications interface(s) 122 and communications interface(s) 134 is below a threshold. At 1232, mobile device 104 sends a command signal to in-vehicle assistant platform 126 for in-vehicle assistant platform to lock display 132. At 1234, in-vehicle assistant platform 126 renders lock screen 802 on graphical user interface 700 and locks the platform. As previously described, the operator of mobile device 104 may manually activate lock screen 802.

Systems and methods described in this specification provide a variety of novel and inventive solutions to technical problems related to providing display systems and graphical user interfaces for land mobile radio systems and emergency response vehicles. For example, systems and methods described in this specification automatically render and display applications that are relevant to a particular workflow item in particular fields of graphical user interfaces distributed across two displays, such as display 124 of mobile device 104 and display 132 of in-vehicle assistant platform 126. In some examples, the most relevant applications are rendered in a priority field—such as field 704 of graphical user interface 700 rendered on display 132 of in-vehicle assistant platform 126. This immediately draws the user's attention to the most critical information for the current workflow item. When the public safety situation evolves, mobile device 104 receives an alert signal, and the most relevant applications are updated and re-rendered in the priority field. This automated process automatically allocates applications and information between higher and lower priority fields across two displays, which optimizes how new information is presented to public safety personnel during dynamic and evolving situations. This reduces the overall cognitive load required for public safety personnel during such situations.

Furthermore, public safety situations often develop rapidly, and public safety personnel may need to leave their vehicles quickly. In such situations, public safety personnel may not have the time to perform a complicated series of interactions to secure potentially sensitive information displayed on in-vehicle assistant platforms—such as on display 132 of in-vehicle assistant platform 126. Systems and methods described in this specification also provide a variety of novel and inventive solutions related to securing such sensitive data. For example, as previously described, mobile device 104 automatically locks in-vehicle assistant platform 126 when a signal strength between communications interface(s) 122 and communications interface(s) 134 falls below a threshold value, thus automatically securing potentially sensitive information displayed on in-vehicle assistant platform 126 when public safety personnel walk away from the vehicle with mobile device 104. This further reduces the overall cognitive load required of public safety personnel by eliminating a manual task (e.g., securing data within their vehicles) during public safety situations, allowing public safety personnel to focus their attention instead on the situation at hand.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the written description and the claims, one or more steps within any given method may be executed in a different order—or steps may be executed concurrently—without altering the principles of this disclosure. Unless otherwise indicated, the numbering or other labeling of instructions or method steps is done for convenient reference and does not necessarily indicate a fixed sequencing or ordering. In the figures, the directions of arrows generally demonstrates the flow of information—such as data or instructions. However, the direction of an arrow does not imply that information is not being transmitted in the reverse direction. The phrase "at least one of A, B, and C" should be construed to indicate a logical relationship (A OR B OR C), where OR is a non-exclusive logical OR, and should not be construed to mean "at least one of A, at least one of B, and at least one of C."

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or they may be distributed among different computing devices—such as computing devices interconnected by one or more networks or other communications systems.

In the claims, if an apparatus or system is claimed as including one or more electronic processors (and/or other elements) configured in a certain manner (for example, to make multiple determinations), the claim or claimed element should be interpreted as meaning one or more of the electronic processors (and/or other elements) where any combination of the one or more electronic processors (and/ or other elements) may be configured to make some or all of the multiple determinations—for example, collectively. To reiterate, those electronic processors and the processing may be distributed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system including:
an in-vehicle assistant (IVA) platform including:
    a first electronic processor,
    a first display, and
    a first communications interface; and
a mobile communication device including:
    a second electronic processor,
    a second display, and
    a second communications interface;
wherein at least one of the first electronic processor or the second electronic processor is configured to:
    receive, from a dispatch platform, a user profile, the user profile including a workflow item and application-access data,
    store the user profile to the mobile communication device,
    access the user profile stored at the mobile communication device,
    parse the user profile to:
        identify a set of authorized applications based on the application-access data contained in the user profile, and
        initialize a workflow item associated with the user profile,
    select, from the set of authorized applications, a first application and a second application correlated to the workflow item, the workflow item defining that the first application is to be rendered on the first display and that the second application is to be rendered on the second display,
    generate and render a first graphical user interface (GUI) on the first display,
    generate and render a second GUI on the second display,
    render the first application on the first GUI and not on the second GUI based on the workflow item, and
    render the second application on the second GUI and not on the first GUI based on the workflow item.

2. The system of claim 1 wherein:
the mobile communication device includes a third communications interface; and
the mobile communication device is configured to receive the user profile from a dispatch platform via the third communications interface.

3. The system of claim 2 wherein:
the mobile communication device is configured to receive an alert signal from the dispatch platform via the third communications interface; and
at least one of the first electronic processor or the second electronic processor is configured to, in response to the mobile communication device receiving the alert signal:
    select a third application from among the set of applications authorized for use by the user profile based on the alert signal, and
    render the third application in a priority field of the first GUI.

4. The system of claim 1 wherein:
the first communications interface is configured to be operatively coupled to the second communications interface via at least one of a wired or wireless communications link; and
at least one of the first electronic processor or the second electronic processor is configured to update the first GUI in response to user inputs at the second GUI.

5. The system of claim 4 wherein at least one of the first electronic processor or the second electronic processor is configured to update the second GUI in response to user inputs at the first GUI.

6. The system of claim 1 wherein the IVA platform is configured to be embedded within a vehicle.

7. The system of claim 1 wherein at least one of the first electronic processor or the second electronic processor is configured to:
determine a signal strength of a wireless signal between the first communications interface and the second communications interface; and
in response to determining that the signal strength is below a threshold, activate a lock screen on the first GUI.

8. The system of claim 1 wherein:
the user profile includes an associated workflow object, the associated workflow object comprising a plurality of assigned task components; and
at least one of the first electronic processor or the second electronic processor is configured to render at least one of the first application or the second application on at least one of the first GUI or the second GUI based on one of the assigned task components.

9. The system of claim 3 wherein:
the alert signal includes an associated updated workflow object, the associated updated workflow object comprising an updated plurality of assigned task components; and
at least one of the first electronic processor or the second electronic processor is configured to select the third application based on one of the updated plurality of assigned task components.

10. The system of claim 1 wherein the mobile communication device includes a land mobile radio system transceiver.

11. A method including:
receiving, from a dispatch platform, a user profile, the user profile including a workflow item and application-access data;
store the user profile to a mobile communication device;
accessing the user profile stored at the mobile communication device using at least one of a first electronic processor of an in-vehicle assistant (IVA) platform or a second electronic processor of the mobile communication device;

parsing the user profile to:

identify a set of authorized applications based on the application-access data contained in the user profile, and initialize a workflow item associated with the user profile;

selecting, from the set of authorized applications, a first application and a second application correlated to the workflow item, the workflow item defining that the first application is to be rendered on a first display of the IVA platform and that the second application is to be rendered on a second display of the mobile communication device;

generating and rendering a first graphical user interface (GUI) on the first display;

generating and rendering a second GUI on the second display;

rendering the first application on the first GUI and not on the second GUI based on the workflow item; and rendering the second application on the second GUI and not on the first GUI based on the workflow item.

12. The method of claim 11 wherein:

the mobile communication device includes a first communications interface; and the mobile communications device is configured to receive the user profile from a dispatch platform via the first communications interface.

13. The method of claim 12 wherein:

the mobile communication device is configured to receive an alert signal from the dispatch platform via the first communications interface; and the method includes, in response to the mobile communication device receiving the alert signal:

selecting a third application from among the set of applications authorized for use by the user profile based on the alert signal, and rendering the third application in a priority field of the first GUI.

14. The method of claim 11 wherein:

the IVA platform includes a second communications interface;

the mobile communication device includes a third communications interface;

the second communications interface is configured to be operatively coupled to the third communications interface via at least one of a wired or wireless communications link; and the method includes updating the first GUI in response to user inputs at the second GUI.

15. The method of claim 14 including updating the second GUI in response to user inputs at the first GUI.

16. The method of claim 11 wherein the IVA platform is configured to be embedded within a vehicle.

17. The method of claim 14 including:

determining a signal strength of a wireless signal between the second communications interface and the third communications interface; and in response to determining that the signal strength is below a threshold, activating a lock screen on the first GUI.

18. The method of claim 11 wherein:

the user profile includes an associated workflow object, the associated workflow object comprising a plurality of assigned task components; and the method includes rendering at least one of the first application or the second application on at least one of the first GUI or the second GUI based on one of the assigned task components.

19. The method of claim 13 wherein:

the alert signal includes an associated updated workflow object, the associated updated workflow object comprising an updated plurality of assigned task components; and at least one of the first electronic processor or the second electronic processor is configured to select the third application based on one of the updated plurality of assigned task components.

20. The method of claim 11 wherein the mobile communication device includes a land mobile radio system transceiver.

* * * * *